(12) United States Patent
Aljuaid

(10) Patent No.: US 11,429,078 B2
(45) Date of Patent: *Aug. 30, 2022

(54) INTELLIGENT DISTRIBUTED INDUSTRIAL FACILITY SAFETY SYSTEM INTER-DEVICE DATA COMMUNICATION

(71) Applicant: Saudi Arabian Oil Company, Dhahran (SA)

(72) Inventor: Muhammad S. Aljuaid, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 302 days.

This patent is subject to a terminal disclaimer.

(21) Appl. No.: 16/801,384

(22) Filed: Feb. 26, 2020

(65) Prior Publication Data
US 2020/0192313 A1 Jun. 18, 2020

Related U.S. Application Data

(63) Continuation of application No. 15/939,688, filed on Mar. 29, 2018, now Pat. No. 10,613,505.

(51) Int. Cl.
G05B 19/048 (2006.01)
G05B 19/418 (2006.01)
G08B 21/18 (2006.01)
G05B 23/02 (2006.01)

(52) U.S. Cl.
CPC ..... *G05B 19/048* (2013.01); *G05B 19/41845* (2013.01); *G05B 23/0221* (2013.01); *G08B 21/182* (2013.01)

(58) Field of Classification Search
CPC ............ G05B 19/048; G05B 19/41845; G05B 23/0221; G08B 21/182

USPC ......................................................... 340/506
See application file for complete search history.

(56) References Cited

U.S. PATENT DOCUMENTS

| 5,950,150 A | 9/1999 | Lloyd et al. |
| 6,598,459 B1 | 7/2003 | Fu |
| 7,701,858 B2 | 4/2010 | Werb et al. |
| 8,026,808 B2 | 9/2011 | Weaver |
| 8,140,658 B1 | 3/2012 | Gelvin et al. |
| 8,312,759 B2 | 11/2012 | McAlister |

(Continued)

FOREIGN PATENT DOCUMENTS

| CN | 103617699 A | 3/2014 |
| EP | 2463838 A1 | 6/2012 |

(Continued)

OTHER PUBLICATIONS

International Search Report and Written Opinion for related PCT application PCT/US2019/023055 dated Jul. 11, 2019.

(Continued)

*Primary Examiner* — Jack K Wang
(74) *Attorney, Agent, or Firm* — Bracewell LLP; Constance G. Rhebergen; Brian H. Tompkins

(57) ABSTRACT

Provided are systems and methods for intelligent distributed industrial facility safety systems. In some embodiments an industrial facility safety system includes remote sensing devices (RSDs) disposed throughout an industrial facility and a facility safety control system (FSCS) adapted to collect safety data from the RSDs, where the RSDs communicate with the FSCS by way of one or more other RSDs based on RSD operational characteristics.

20 Claims, 10 Drawing Sheets

(56) References Cited

U.S. PATENT DOCUMENTS

| | | | |
|---|---|---|---|
| 9,424,514 B2 | 8/2016 | Weng | |
| 9,543,998 B2 | 1/2017 | Honjo et al. | |
| 9,547,970 B2 | 1/2017 | Jobin et al. | |
| 9,549,049 B2 | 1/2017 | Lim et al. | |
| 9,847,008 B2 * | 12/2017 | Hunter | G08B 21/12 |
| 9,860,677 B1 | 1/2018 | Agerstam et al. | |
| 9,898,917 B2 | 2/2018 | Miller et al. | |
| 9,904,902 B2 * | 2/2018 | Skaaksrud | G06Q 30/0639 |
| 10,055,965 B2 | 8/2018 | Prabhakar et al. | |
| 10,453,023 B2 * | 10/2019 | Skaaksrud | H04H 20/71 |
| 10,861,265 B1 * | 12/2020 | Merkley | G06V 10/751 |
| 11,244,557 B1 * | 2/2022 | Choi | G08B 25/10 |
| 2003/0069002 A1 | 4/2003 | Hunter et al. | |
| 2004/0204915 A1 | 10/2004 | Steinthal et al. | |
| 2005/0068171 A1 | 3/2005 | Kelliher et al. | |
| 2006/0242127 A1 * | 10/2006 | Boone | H04L 12/66 |
| 2007/0061266 A1 | 3/2007 | Moore et al. | |
| 2008/0074254 A1 | 3/2008 | Towndend et al. | |
| 2008/0189142 A1 | 8/2008 | Brown et al. | |
| 2010/0148940 A1 | 6/2010 | Gelvin et al. | |
| 2010/0254345 A1 | 10/2010 | Raravi et al. | |
| 2011/0291827 A1 | 12/2011 | Baldocchi et al. | |
| 2012/0046792 A1 | 2/2012 | Secor | |
| 2012/0106362 A1 | 5/2012 | Reumerman et al. | |
| 2013/0107909 A1 | 5/2013 | Jones et al. | |
| 2013/0328697 A1 | 12/2013 | Lundy | |
| 2014/0213191 A1 | 7/2014 | Courtice | |
| 2015/0116093 A1 | 4/2015 | Swager et al. | |
| 2015/0245220 A1 | 8/2015 | Williamson et al. | |
| 2015/0316383 A1 | 11/2015 | Donikian | |
| 2015/0351084 A1 * | 12/2015 | Werb | H04W 12/08 370/329 |
| 2015/0365285 A1 | 12/2015 | Phillips | |
| 2016/0110984 A1 | 4/2016 | Seol | |
| 2016/0217345 A1 | 7/2016 | Appel et al. | |
| 2016/0283443 A1 | 9/2016 | Michalscheck et al. | |
| 2016/0330082 A1 * | 11/2016 | Bliss | G06F 3/04842 |
| 2016/0359825 A1 | 12/2016 | Chand et al. | |
| 2017/0132884 A1 | 5/2017 | Kumar et al. | |
| 2017/0154509 A1 | 6/2017 | Prabhakar et al. | |
| 2017/0154518 A1 * | 6/2017 | Prabhakar | G08B 7/06 |
| 2017/0205454 A1 | 7/2017 | Rachakonda et al. | |
| 2017/0282371 A1 * | 10/2017 | Erhart | G06Q 30/016 |
| 2017/0336947 A1 * | 11/2017 | Bliss | G06Q 10/087 |
| 2018/0018867 A1 * | 1/2018 | Locke | G06V 20/52 |
| 2018/0024091 A1 | 1/2018 | Wang et al. | |
| 2018/0072223 A1 | 3/2018 | Arunachalam et al. | |
| 2018/0091989 A1 | 3/2018 | Baroudi et al. | |
| 2018/0242312 A1 | 8/2018 | Ghandi et al. | |
| 2019/0113414 A1 | 4/2019 | Tsuzuki et al. | |
| 2019/0318606 A1 | 10/2019 | Kanukurthy et al. | |
| 2020/0257608 A1 * | 8/2020 | Fradkin | G05B 23/0254 |

FOREIGN PATENT DOCUMENTS

| | | |
|---|---|---|
| EP | 2869659 A1 | 5/2015 |
| WO | 2010099226 A1 | 9/2010 |

OTHER PUBLICATIONS

International Search Report and Written Opinion for related PCT application PCT/US2019/023057 dated Jun. 24, 2019.

International Search Report and Written Opinion for related PCT application PCT/US2019/023060 dated Jun. 21, 2019.

* cited by examiner

US 11,429,078 B2

INTELLIGENT DISTRIBUTED INDUSTRIAL FACILITY SAFETY SYSTEM INTER-DEVICE DATA COMMUNICATION

RELATED APPLICATIONS

This application is a continuation of U.S. patent application Ser. No. 15/939,688 filed on Mar. 29, 2018 and titled "Intelligent Distributed Industrial Facility Safety System", which is hereby incorporated by reference.

FIELD

Embodiments relate generally to industrial safety and more particularly to distributed industrial facility safety systems employing remote sensing devices and intelligent facility safety control systems.

BACKGROUND

Employee health and safety continues to be an area of great importance to employers. Safety concerns are especially heightened for industrial facilities (often referred to as "industrial worksites", "industrial plants" or simply "plants"). Industrial facilities include, for example, oil and gas plants, power plants, and the like. Industrial facilities can be complex systems that include large machinery, electrical systems, flow control systems, and the like. Large machinery can include, for example, turbomachinery, such as turbines, generators and compressors with components rotating at extremely high rates. Electrical systems can include, for example, power systems that generate, regulate and transport high-voltage and high-current electrical power. Flow control systems can include, for example, flow control mechanisms, such as valves, pressure vessels and pipes that regulate the flow of substances, such as oil and natural gas, at varying temperatures and pressures. Given their complexity, industrial facilities typically employ safety devices and safety procedures to minimize the risk of safety incidents, such as physical injuries to persons, damage to the environment and damage to the industrial facility itself.

An industrial facility often employs a process control system (PCS) and an industrial safety system (ISS). These systems are normally integrated with one another and are often referred to collectively as an integrated control and safety system (ICSS). The PCS typically monitors and controls the operations of the industrial facility systems to execute day-to-day operations of the facility, such as the processing of oil and natural gas. The ISS typically oversees the safety of the industrial facility, such as monitoring physical systems and taking actions to protect persons, the industrial facility systems and the environment. These actions can include, for example, activating safety systems, deactivating malfunctioning equipment, issuing alerts and the like.

SUMMARY

Applicants have recognized that existing integrated control and safety systems (ICSSs) and associated industrial safety systems (ISSs) generally rely on static sensing systems and predefined responses. For example, existing ISSs often rely on a centralized controller monitoring a set number of fixed sensors disposed throughout an industrial facility (e.g., sensors disposed on components of turbomachinery, electrical systems and/or flow control systems), and implementing a predefined response when one or more of the sensors indicates an safety hazard (e.g., a facility-wide shut-down when one or more of the sensors reports measurements outside of acceptable operating ranges). Although this type of safety monitoring can be successful in recognizing and resolving certain safety issues, it can be relatively inflexible, non-robust, and/or inefficient and/or ineffective under certain conditions. With regard to being inflexible, fixed sensors may not provide a suitable amount of coverage to more important areas of a facility. For example, sensors distributed throughout a facility, in different locations, may provide a relatively balanced coverage even when a large portion of facility personnel are located in certain areas of the facility, and thus it would be beneficial to have a heightened level of monitoring in those areas. In such a configuration, it may not be practical to relocate the fixed sensors as personnel migrate throughout the facility. With regard to being non-robust, the sensors often rely on direct communication with a centralized controller and thus monitoring of an area may not be possible if one or more sensors in the area lose communication with the centralized controller. This can lead to gaps in monitoring that can result in catastrophic consequences if an alert condition goes undetected due to the lack of communication. With regard to inefficient or ineffective responses, existing ISSs may over estimate or underestimate the nature of an event, and may provide a response that is too broad or limited to be effective and efficient. For example, if the fixed sensors are unable to pinpoint the location or migration of an event, such as a gas leak, across a facility, the ISS may implement broadly sweeping remedial actions, such as shutting down a majority or all plant operations, including equipment and processes that are not at risk or that may otherwise be helpful in remediating the issue. As a further example, if fixed leak detection sensors provide only partial coverage of an area, it may be impossible to determine a precise location of a gas leak and how the gas is migrating through the facility, resulting in the ISS issuing a facility-wide alert, without being able to provide specifics of the most critical areas for personnel to evacuate and avoid, or failing to issue an alert for an area affected by the gas leak. This can be especially critical for situations in which personnel need to circumvent an area, for example, to avoid exposure to a leaked toxic substance.

Recognizing these and other shortcomings of existing ISSs, Applicants have developed intelligent industrial facility safety systems employing remote sensing devices. In some embodiments an industrial facility includes an industrial safety system ("ISS") and one or more industrial facility devices ("facility equipment"). The ISS can include a facility safety control system ("FSCS") and one or more remote sensing devices ("RSDs"). In some embodiments, the RSDs include fixed-facility RSDs (or "fixed RSDs") and/or mobile-personal RSDs (or "mobile RSDs") that are distributed throughout the industrial facility. A fixed RSD can include a RSD that remains stationary, such as, a RSD that is affixed to stationary facility equipment, such as a turbine, a generator, a compressor, a pump, a pressure vessel, and/or a pipe, or otherwise provided in relatively stationary position, such as attached to a pole, scaffolding and/or another stationary structure of the facility. A mobile RSD can include a RSD that is portable, such as a personal RSD that is carried by or otherwise attached to a person (e.g., a person working in the facility) or mobile device (e.g., a robot and/or drone) that moves throughout the facility. This can facilitate the personal RSDs moving throughout the facility to monitor conditions in areas of the facility where persons are located.

In some embodiments, a RSD includes a sensing unit, a processing unit, memory, a communications unit, and/or an alert unit. The sensing unit can include one more sensors for sensing various characteristics of the environment surrounding the RSD, including characteristics of a person or a device (e.g., a piece of facility equipment and/or a mobile device) the RSD is attached to or is otherwise associated with. The sensors can include, for example, temperature sensors, flowrate sensors, pressure sensors, vibration sensors, gas detection sensors, acoustic sensors (e.g., microphones), and/or location sensors. The alert unit can include a device for presenting alerts audibly, visually, and/or in a tactile manner. For example, the alert unit may include a speaker for audibly broadcasting alerts, a display screen or lights for visually displaying alerts, and/or a vibration mechanism for providing a tactile sensation to communicate an alert. Corresponding alerts can also be provided, for example, by way of external alert devices, such as displays or speakers located throughout the facility.

As described, the RSDs and the FSCS can be configured in different communication schemes, such as standalone, mesh, distributed and distributed-mesh configurations. The different communication schemes may support the robust and efficient exchange of safety information (e.g., sensed safety data and alerts) between RSDs and/or the FSCS. Alerts can be presented in various formats to communicate varying types of information. For example, alerts can presented with varying combinations of lights, sirens and instructions to communicate alert content to persons in the facility. Alert content can include various types of content to be communicated to persons in the facility, such as status information, suggested actions, or instructions for taking actions. The RSDs can include modular devices that enable various modular sensor modules to be installed therein, thereby enabling on-demand installation of sensors. The ISS may employ intelligence to monitor and learn characteristics of the facility and/or persons, and adapt alerts and/or other operations to the learned characteristics.

Provided in some embodiments is an industrial facility safety system, including: a plurality of RSDs disposed throughout an industrial facility; and a FSCS adapted to: collect safety data from the plurality of RSDs; determine current conditions of the industrial facility based on the safety data collected; determine that an alert condition exists based on the current conditions determined; identify a second level alert associated with the alert condition; generate the second level alert for presentation to personnel in the industrial facility; monitor a response to presentation of the second level alert, the response indicating whether the second level alert is too low of a priority, too high of a priority, or of an appropriate priority for the alert condition; in response to determining that the response indicates that the second level alert is too low of a priority for the alert condition: incrementing a too low count associated with the alert condition and the second level alert; determining whether the too low count associated with the alert condition and the second level alert exceeds a too low count threshold; and in response to determining that the too low count associated with the alert condition and the second level alert exceeds the too low count threshold, associating a third level alert with the alert condition, the third level alert being of higher priority than the second level alert; and in response to determining that the response indicates that the second level alert is too high of a priority for the alert condition: incrementing a too high count associated with the alert condition and the second level alert; determining whether the too high count associated with the alert condition and the second level alert exceeds a too high count threshold; in response to determining that the too high count associated with the alert condition and the second level alert exceeds the too high count threshold, associating a first level alert with the alert condition, the first level alert being of lower priority than the second level alert.

In some embodiments, the FSCS is further adapted to, in response to determining the response indicates that the second level alert is of an appropriate priority for the alert condition, set the too high count associated with the alert condition and the second level alert to zero. In certain embodiments, the FSCS is further adapted to: collect second safety data from the plurality of RSDs; determine second current conditions of the industrial facility based on the second safety data collected; determine that the alert condition exists based on the second current conditions determined; identify an alert currently associated with the alert condition; and generate the alert currently associated with the alert condition for presentation to personnel in the industrial facility. In some embodiments, the alert currently associated with the alert condition includes one of the first level alert, the second level alert and the third level alert. In certain embodiments, the first level alert includes an alert adapted to be presented by a first subset of the plurality of RSDs that are associated with the alert condition, the second level alert includes an alert adapted to be presented in one or more regions of the industrial facility that are associated with the alert condition, and the third level alert includes a facility wide alert adapted to be presented in all regions of the industrial facility. In some embodiments, the FSCS is further adapted to: determine a zone of interest within the industrial facility based on the current conditions of the industrial facility; collect third safety data from the plurality of RSDs; determine third current conditions of the industrial facility based on the third safety data collected; and adjust the zone of interest based on the third current conditions of the industrial facility. In certain embodiments, the FSCS is further adapted to: determine a sensor module associated with the adjusted zone of interest; determine one or more RSDs located in the adjusted zone of interest; and send, to the one or more RSDs located in the adjusted zone of interest, an alert to install the sensor module in the one or more RSDs. In some embodiments, the FSCS is further adapted to: determine a sensing state associated with the adjusted zone of interest; determine one or more RSDs located in the adjusted zone of interest; and command the one or more RSDs located in the adjusted zone of interest to operate in the sensing state.

Provided in some embodiments is a method of industrial facility safety monitoring. The method including: collecting, by a FSCS, first safety data from a plurality of RSDs disposed throughout an industrial facility; determining, by the FSCS, first current conditions of the industrial facility based on the safety data collected; determining, by the FSCS, that an alert condition exists based on the first current conditions determined; identifying, by the FSCS, a first alert associated with the alert condition; generating, by the FSCS, the first alert for presentation to personnel in the industrial facility; monitoring, by the FSCS, a response to presentation of the first alert, the response indicating whether the first alert is too low of a priority, too high of a priority, or of an appropriate priority for the alert condition; in response to the FSCS determining that the response indicates that the first alert is too high of a priority for the alert condition, the FSCS: incrementing a too high count associated with the alert condition and the first alert; determining that the too high count associated with the alert condition and the first alert exceeds a too high count threshold; in response to determining that the too high count associated with the alert condition and the first alert exceeds the too high count threshold, associating a second alert with the alert condition, the second alert being of lower priority than the first alert.

In some embodiments, the method further includes: collecting, by the FSCS, second safety data from the plurality of RSDs; determining, by the FSCS, second current conditions of the industrial facility based on the second safety data collected; determining, by the FSCS, that the alert condition exists based on the second current conditions determined; identifying, by the FSCS, the second alert currently associated with the alert condition; and generating, by the FSCS, the second alert currently associated with the alert condition for presentation to the personnel in the industrial facility. In certain embodiments, the method further includes: collecting, by the FSCS, third safety data from the plurality of RSDs; determining, by the FSCS, third current conditions of the industrial facility based on the third safety data collected; determining, by the FSCS, that the alert condition exists based on the third current conditions determined; identifying, by the FSCS, a third alert currently associated with the alert condition; generating, by the FSCS, the third alert currently associated with the alert condition for presentation to the personnel in the industrial facility; monitoring, by the FSCS, a response to presentation of the third alert, the response indicating whether the third alert is too low of a priority, too high of a priority, or of an appropriate priority for the alert condition; in response to the FSCS determining that the response indicates that the third alert is too low of a priority for the alert condition, the FSCS: incrementing a too low count associated with the alert condition and the third alert; determining that the too low count associated with the alert condition and the third alert exceeds a too low count threshold; and in response to determining that the too low count associated with the alert condition and the third alert exceeds the too low count threshold, associating a fourth alert with the alert condition, the fourth alert being of higher priority than the third alert. In some embodiments, the method further includes: collecting, by the FSCS, fourth safety data from the plurality of RSDs; determining, by the FSCS, fourth current conditions of the industrial facility based on the fourth safety data collected; determining, by the FSCS, that the alert condition exists based on the fourth current conditions determined; identifying, by the FSCS, a fifth alert currently associated with the alert condition; generating, by the FSCS, the fifth alert currently associated with the alert condition for presentation to the personnel in the industrial facility; monitoring, by the FSCS, a response to presentation of the fifth alert, the response indicating whether the fifth alert is too low of a priority, too high of a priority, or of an appropriate priority for the alert condition; and in response to the FSCS determining the response indicates that fifth alert is of an appropriate priority for the alert condition, the FSCS setting a too high count associated with the alert condition and the fifth alert to zero. In certain embodiments, the second alert includes an alert presented by a first subset of the plurality of RSDs that are associated with the alert condition, and the first alert includes an alert presented in one or more regions of the industrial facility that are associated with the alert condition or a facility wide alert presented in all regions of the industrial facility. In some embodiments, the method further includes: determining, by the FSCS, a zone of interest within the industrial facility based on the current conditions of the industrial facility; collecting, by the FSCS, fifth safety data from the plurality of RSDs; determining, by the FSCS, fifth current conditions of the industrial facility based on the fifth safety data collected; and adjusting, by the FSCS, the zone of interest based on the fifth current conditions of the industrial facility. In some embodiments, the method further includes: determining, by the FSCS, a sensor module associated with the adjusted zone of interest; determining, by the FSCS, one or more RSDs located in the adjusted zone of interest; and sending, by the FSCS to the one or more RSDs located in the adjusted zone of interest, an alert to install the sensor module in the one or more RSDs. In some embodiments, the method further includes: determining, by the FSCS, a sensing state associated with the adjusted zone of interest; determining, by the FSCS, one or more RSDs located in the adjusted zone of interest; and commanding, by the FSCS, the one or more RSDs located in the adjusted zone of interest to operate in the sensing state.

Provided in some embodiments is a non-transitory computer readable storage medium including program instructions stored thereon that are executable by a processor to cause the following operations of industrial facility safety monitoring: collecting, by a FSCS, safety data from a plurality of RSDs disposed throughout an industrial facility; determining, by the FSCS, current conditions of the industrial facility based on the safety data collected; determining, by the FSCS, that an alert condition exists based on the current conditions determined; identifying, by the FSCS, a second level alert associated with the alert condition; generating, by the FSCS, the second level alert for presentation to personnel in the industrial facility; monitoring, by the FSCS, a response to presentation of the second level alert, the response indicating whether the second level alert is too low of a priority, too high of a priority, or of an appropriate priority for the alert condition; in response to determining that the response indicates that the second level alert is too low of a priority for the alert condition: incrementing a too low count associated with the alert condition and the second level alert; determining whether the too low count associated with the alert condition and the second level alert exceeds a too low count threshold; and in response to determining that the too low count associated with the alert condition and the second level alert exceeds the too low count threshold, associating a third level alert with the alert condition, the third level alert being of higher priority than the second level alert; and in response to determining that the response indicates that the second level alert is too high of a priority for the alert condition: incrementing a too high count associated with the alert condition and the second level alert; determining whether the too high count associated with the alert condition and the second level alert exceeds a too high count threshold; and in response to determining that the too high count associated with the alert condition and the second level alert exceeds the too high count threshold, associating a first level alert with the alert condition, the first level alert being of lower priority than the second level alert.

In some embodiments, the operations further include: in response to determining the response indicates that the second level alert is of an appropriate priority for the alert condition, set the too high count associated with the alert condition and the second level alert to zero. In some embodiments, the operations further include: collecting second safety data from the plurality of RSDs; determining second current conditions of the industrial facility based on the second safety data collected; determining that the alert condition exists based on the second current conditions determined; identifying an alert currently associated with the alert condition; and generating the alert currently associated with the alert condition for presentation to personnel in the industrial facility. In some embodiments, the alert currently associated with the alert condition includes one of the first level alert, the second level alert and the third level alert. In some embodiments, the first level alert includes an alert adapted to be presented by a first subset of the plurality of RSDs that are associated with the alert condition, the second level alert includes an alert adapted to be presented in one or more regions of the industrial facility that are associated with the alert condition, and the third level alert includes a facility wide alert adapted to be presented in all regions of the industrial facility. In some embodiments, the operations further include: determining a zone of interest within the industrial facility based on the current conditions of the industrial facility; collecting third safety data from the plurality of RSDs; determining third current conditions of the industrial facility based on the third safety data collected; and adjusting the zone of interest based on the second current conditions of the industrial facility. In some embodiments, the operations further include: determining a sensor module associated with the adjusted zone of interest; determining one or more RSDs located in the adjusted zone of interest; and sending, to the one or more RSDs located in the adjusted zone of interest, an alert to install the sensor module in the one or more RSDs. In some embodiments, the operations further include: determining a sensing state associated with the adjusted zone of interest; determining one or more RSDs located in the adjusted zone of interest; and commanding the one or more RSDs located in the adjusted zone of interest to operate in the sensing state.

Figure 1:
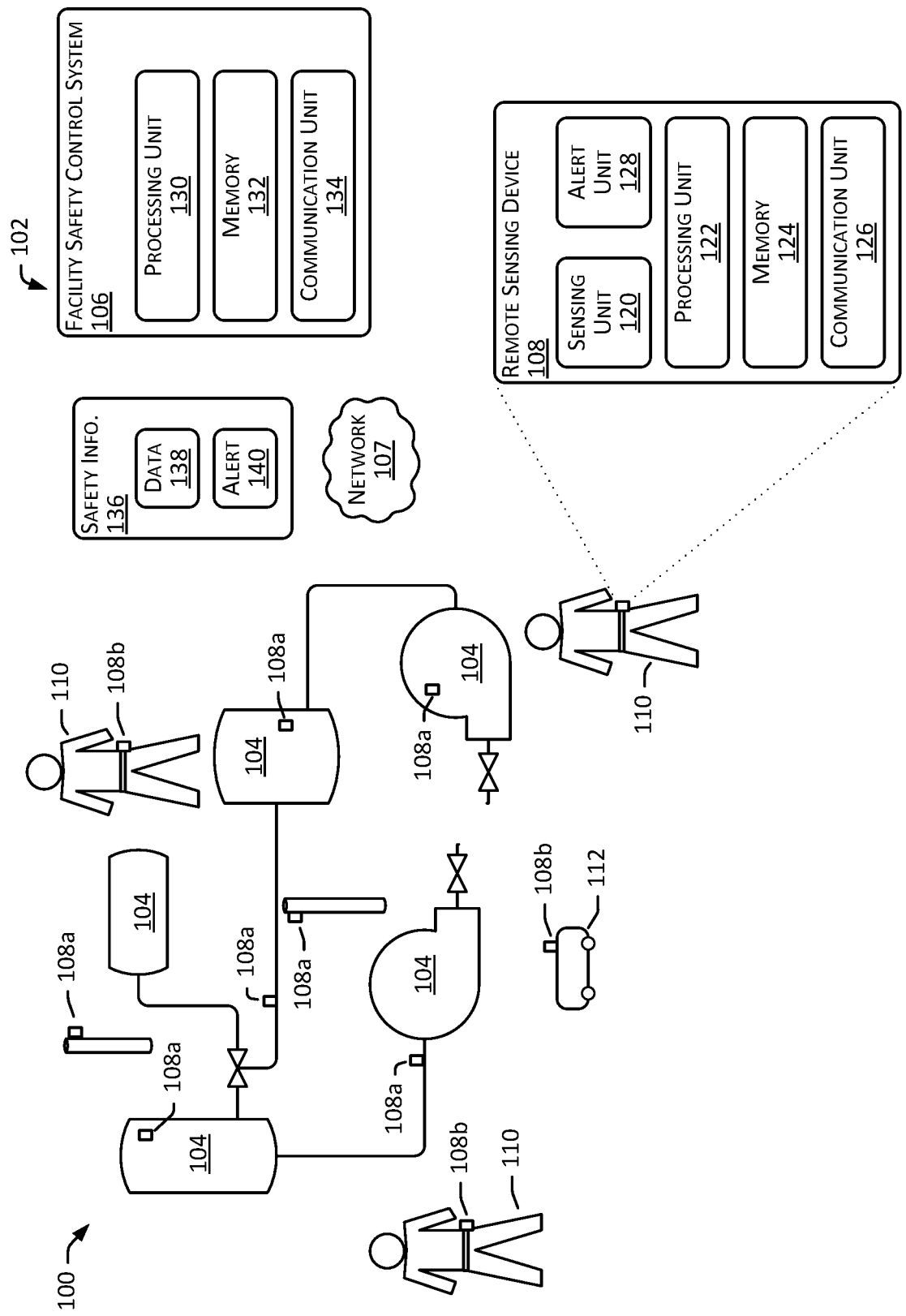
FIG. 1 is a block diagram that illustrates an industrial facility environment in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION

Described are embodiments of systems and methods for intelligent industrial facility safety systems employing remote sensing devices. In some embodiments an industrial facility includes an industrial safety system ("ISS") and one or more industrial facility devices ("facility equipment"). The ISS can include a facility safety control system ("FSCS") and one or more remote sensing devices ("RSDs"). In some embodiments, the RSDs include fixed-facility RSDs (or "fixed RSDs") and/or mobile-personal RSDs (or "mobile RSDs") that are distributed throughout the industrial facility. A fixed RSD can include a RSD that remains stationary, such as, a RSD that is affixed to stationary facility equipment, such as a turbine, a generator, a compressor, a pump, a pressure vessel, and/or a pipe, or otherwise provided in relatively stationary position, such as attached to a pole, scaffolding and/or another stationary structure of the facility. A mobile RSD can include a RSD that is portable, such as a personal RSD that is carried by or otherwise attached to a person (e.g., a person working in the facility) or mobile device (e.g., a robot and/or drone) that moves throughout the facility. This can facilitate the personal RSDs moving throughout the facility to monitor conditions in areas of the facility where persons are located.

In some embodiments, a RSD includes a sensing unit, a processing unit, memory, a communications unit, and/or an alert unit. The sensing unit can include one more sensors for sensing various characteristics of the environment surrounding the RSD, including characteristics of a person or a device (e.g., a piece of facility equipment and/or a mobile device) the RSD is attached to or is otherwise associated with. The sensors can include, for example, temperature sensors, flowrate sensors, pressure sensors, vibration sensors, gas detection sensors, microphones, and/or location sensors. The alert unit can include a device for presenting alerts audibly, visually, and/or in a tactile manner. For example, the alert unit may include a speaker for audibly broadcasting alerts, a display screen or lights for visually displaying alerts, and/or a vibration mechanism for providing a tactile sensation to communicate an alert. Corresponding alerts can also be provided, for example, by way of external alert devices, such as displays or speakers located throughout the facility.

As described, the RSDs and the FSCS can be configured in different communication schemes, such as standalone, mesh, distributed and distributed-mesh configurations. The different communication schemes may support the robust and efficient exchange of safety information (e.g., sensed safety data and alerts) between RSDs and/or the FSCS. Alerts can be presented in various formats to communicate varying types of information. For example, alerts can be presented with varying combinations of lights, sirens and instructions to communicate alert content to persons in the facility. Alert content can include various types of content to be communicated to persons in the facility, such as status information, suggested actions, or instructions for taking actions. The RSDs can include modular devices that enable various modular sensor modules to be installed therein, thereby enabling on-demand installation of sensors. The ISS may employ intelligence to monitor and learn characteristics of the facility and/or persons, and adapt alerts and/or other operations to the learned characteristics.

FIG. 1 is a block diagram that illustrates an industrial facility environment ("industrial facility") in accordance with one or more embodiments. In the illustrated embodiment, the industrial facility 100 includes an industrial safety system ("ISS") 102 and one or more industrial facility devices ("facility equipment") 104. The ISS 102 can include a facility safety control system ("FSCS") 106 and one or more remote sensing devices ("RSDs") 108. Various devices of the facility may be communicatively coupled to one another by way of a network 107.

The network 107 can include an element or system that facilitates communication between the entities of the industrial facility 100. For example, the network 107 may include an electronic communications network, such as a local area network (LAN), a wide area network (WAN), a wireless local area network (WLAN), a cellular communications network, a short range wireless communications network (e.g., a Bluetooth wireless network), the Internet, an industrial network, and/or the like. In some embodiments, the network 107 can include a single network or a combination of networks. As described, the RSDs 108 may communicate directly with the FSCS 106 via a distributed or distributed-mesh network, and/or may communicate directly with one another via a mesh network or a distributed-mesh network.

The industrial facility 100 can be, for example, an oil and gas plant, a power plant, and/or the like. The facility equipment 104 can include large machinery, electrical systems, flow control systems, and/or the like of the industrial facility 100. Large machinery can include, for example, turbomachinery, such as turbines, generators and compressors having components rotating at an extremely high rates. Electrical systems can include, for example, power systems that generate and transport high-voltage electrical power. Flow control systems can include, for example, flow control mechanisms, such as valves, pressure vessels and pipes that regulate the flow of substances, such as oil and natural gas, at varying temperatures and pressures.

In some embodiments, the RSDs 108 include fixed-facility remote sensing devices (or "fixed RSDs") 108a and/or mobile-personal remote sensing devices (or "mobile RSDs") 108b that are distributed throughout the industrial facility 100. A fixed RSD 108a can include a RSD 108 that remains stationary. A fixed RSD 108a can include, for example, a RSD 108 that is affixed to stationary facility equipment 104, such as a turbine, a generator, a compressor, a pump, a pressure vessel, and/or a pipe, or otherwise provided in relatively stationary position, such as attached to a pole, scaffolding and/or another stationary structure of the facility 100. A mobile RSD 108b can include a RSD 108 that is portable. A mobile RSD 108b can include a personal RSD 108 that is carried by or otherwise attached to a person 110 (e.g., a person working in the facility 100) or mobile device 112 (e.g., a robot and/or drone) that can move throughout the facility 100. This can facilitate the personal RSDs 108b moving throughout the facility 100 to provide for monitoring of conditions in areas of the facility 100 where persons 110 are or are not located. In some embodiments, a mobile device 112 includes a mobile wireless network hub (e.g., a "wireless network hotspot") that enables other network devices within the facility 100 to connect to the network 107 by way of the mobile device 112. This can, for example, provide temporary network access in areas where the communication infrastructure within the facility 100 is disrupted (e.g., during a safety incident), or can provide network access in areas where a permanent network access point is not provided. In some embodiments, a mobile device 112 can be certified and employed to inspect high risk areas, such as areas experiencing or susceptible to hazardous material leaks, extremely high or low temperatures, and/or the like. For example, a certified mobile device 112 may be programmed to follow a route within the facility 100 to inspect high risk areas, regularly or in response to a safety event, such as detection of a gas leak to sense environmental conditions in those areas.

In some embodiments, a RSD 108 includes a sensing unit 120, a processing unit 122, memory 124, a communications unit 126, and/or an alert unit 128. The sensing unit 120 can include one more sensors for sensing various characteristics of the environment surrounding the RSD 108, including characteristics of a person 110 or a device (e.g., a piece of facility equipment 104 and/or a mobile device 112) the RSD 108 is attached to or is otherwise associated with. The sensors can include, for example, temperature sensors, flow-rate sensors, pressure sensors, vibration sensors, gas detection sensors, microphones, health sensors and/or location sensors. The alert unit 128 can include a device for presenting alerts audibly, visually, and/or in a tactile manner. For example, the alert unit 128 may include a speaker for audibly broadcasting alerts, a display screen or lights for visually displaying alerts, and/or a vibration mechanism for providing a tactile sensation to communicate an alert. The presentation of the alerts may be intended for receipt by the person 110 wearing the RSD 108 and/or other persons 110 nearby the RSD 108. Corresponding alerts can also be provided, for example, by way of external alert devices, such as displays or speakers located throughout the facility 100.

The processing unit 122 may provide for executing operational aspects of the RSD 108, such as receiving, sending and/or processing safety information 136, and/or interacting with the facility equipment 104. The safety information 136 can include sensor data 138 indicative of conditions sensed by sensors of the RSDs 108 and/or other sensing devices, and/or safety alerts ("alerts") 140 (e.g., including information, instructions, control commands, and/or the like), such as those described herein. In some embodiments, the memory 124 provides for storage of data employed by the RSD 108, including program instructions executable by the processing unit 122 to perform the operations described with regard to the RSD 108. In some embodiments, the communication unit 126 provides for the communication of data between the RSD 108 and other devices of the facility 100, such as the FSCS 106 and/or other RSDs 108, by way of the network 107. In some embodiments, a RSD 108 includes a computer device that is the same or similar to computer system 1000 described herein with regard to at least FIG. 8.

In some embodiments, the sensing unit of a mobile RSD 108b includes one or more sensors for sensing characteristics of the environment surrounding the mobile RSD 108b, including characteristic of the person 110 or mobile device 112 the mobile RSD 108b is ultimately attached to. For example, the sensing unit 120 of a mobile RSD 108b carried by a person 110 working in the facility 100 may include a temperature sensor for sensing the temperature of the environment surrounding the mobile RSD 108b and the temperature of the person 110, a gas detection sensor for sensing the presence and/or concentrations of gases in the environment surrounding the mobile RSD 108b and the person 110, an acoustic sensor (e.g., a microphone) for sensing sounds in the environment surrounding the mobile RSD 108b and the person 110, and/or a location sensor for sensing a geographic location of the mobile RSD 108b and the person 110, and/or health sensors for sensing health characteristics of the person 110.

In some embodiments, the sensing unit of a fixed RSD 108a includes one or more sensors for sensing operational characteristics of the equipment 104 the fixed RSD 108a is ultimately attached to and/or characteristics of the environment surrounding the equipment 104 the fixed RSD 108a is ultimately attached to. For example, the sensing unit of a fixed RSD 108a attached to pump may include pressure sensors for sensing the input and output pressures of the pump, flowrate sensors for sensing the input and output flowrates of the pump, temperature sensors for sensing the operating temperature of the pump, the temperature of the fluid entering and exiting the pump, and the temperature of the environment surrounding the pump, vibration sensors for detecting vibrations of the pump, an acoustic sensors for sensing acoustic signatures of the pump and/or fluid flowing though the pump, gas detection sensors for sensing the presence and/or concentrations of gases in the environment surrounding the pump, and/or a location sensor for sensing a geographic location of the pump.

In some embodiments, the FSCS 106 includes a processing unit 130, memory 132, and/or a communications unit 134. The processing unit 130 may provide for executing operational aspects of the FSCS 106, such as receiving and/or sending safety information 136, processing the safety information 136, and/or interacting with the facility equipment 104 and/or RSDs 108 within the facility to monitor and/or control operational aspects of the facility equipment 104 and/or the RSDs 108. In some embodiments, the FSCS 106 can communicate with external entities to acquire and disseminate relevant information. For example, the FSCS 106 may receive current or forecast weather conditions from an external weather provider, the FSCS 106 may receive reports of emergency response personnel availability (e.g., firefighter and emergency medical services (EMS) availability) from an emergency response provider, and/or communicate needs for emergency response personnel to the emergency response provider. In some embodiments, the FSCS 106 can adapt to conditions based on learned, historical patterns. For example, if a particular set of conditions, such as a weather pattern, is determined to preceded a given event, such as a gas leak, at least a predetermined number of times, the FSCS 106 may associate the set of conditions with the event, and in response to identifying the occurrence, or the expected occurrence of the set of conditions, the FSCS 106 may preemptively issue a corresponding alert for the event, such as instructing an inspection of an area of an anticipated gas leak in response to determining that a weather pattern associated with the gas leak is occurring or is forecast, based on the weather information received from the external weather provider. The safety information 136 can include sensor data 138 indicative of conditions sensed by sensors of the RSDs 108 and/or other sensing devices, and/or alerts 140, such as those described herein. In some embodiments, the memory 132 provides for storage of data employed by the FSCS 106, including program instructions executable by the processing unit 130 to perform the operations described with regard to the FSCS 106. In some embodiments, the communication unit 134 provides for the communication of data between the FSCS 106 and other devices of the facility 100, such as the RSDs 108, via the network 107. In some embodiments, the FSCS 106 includes a computer device that is the same or similar to computer system 1000 described herein with regard to at least FIG. 8.

The RSDs 108 of the facility 100 may operate in various configurations. With regard to communication, RSDs 108 may operate in a standalone (or "isolated") configuration (e.g., the RSD 108 does not communicate with the other RSDs 108 or the FSCS 106), a distributed (or "direct) configuration (e.g., the RSD 108 does not communicate with the other RSD 108, but communicates directly with the FSCS 106), a meshed configuration (e.g., the RSDs 108 communicates with other RSD 108, but does not communicate directly with the FSCS 106), or a distributed-mesh (or "hybrid") configuration (e.g., the RSD 108 communicates directly with other RSD 108, and communicates directly with the FSCS 106). With regard to processing, RSDs 108 may be configured for local processing (e.g., processing performed at the RSD 108, with the results not shared with the other RSDs 108), distributed processing (e.g., processing performed by one or more RSD 108, with the results being shared between RSDs 108), centralized processing (e.g., processing performed at the FSCS 106), or hybrid processing (e.g., processing performed at one or more RSDs 108 and/or the FSCS 106). With regard to management, RSDs 108 may be self-managed (e.g., the RSD 108 controls operations performed by the RSD 108) or centrally managed (e.g., operations of the RSD 108 are controlled by the FSCS 106).

Figure 2A:
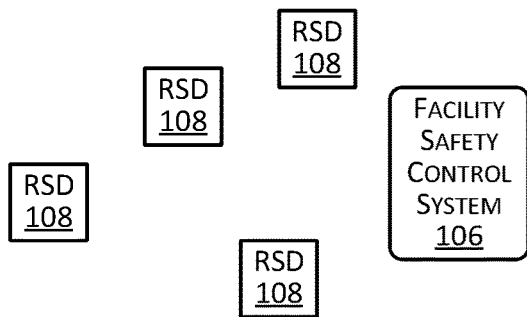
FIG. 2A is a diagram that illustrates remote sensing devices (RSDs) of an industrial facility operating in a standalone configuration in accordance with one or more embodiments.

In some embodiments, one or more RSDs 108 of the facility 100 operate in a standalone configuration, operating individually from one another. FIG. 2A is a diagram that illustrates RSDs 108 of the facility 100 operating in a standalone (or "isolated") configuration in accordance with one or more embodiments. In a standalone configuration, there may be no inter-communication between the RSDs 108 and/or the FSCS 106, as illustrated by the lack of arrows extending between the RSDs 108 and/or the FSCS 106. In some embodiments, a RSD 108 operating in a standalone configuration obtains sensor data 138 locally (e.g., the RSD 108 may collect sensor data 138 from the sensors of the sensing unit 120 of the RSD 108), process the sensor data 138 locally (e.g., the RSD 108 may process the sensor data 138 at the processing unit 122 of the RSD 108 to determine whether an alert condition exits), and provides any corresponding local alerts (e.g., the RSD 108 may present alerts 140 indicative of an alert condition, locally by way of its alert unit 128). This may be done, for example, independent of communication with the other RSDs 108 and the FSCS 106 of the facility 100. Such independent operation may provide relatively robust RSDs 108 that can operate independent of an ability to establish communication with other devices of the facility 100, including any of the other RSDs 108 and the FSCS 106 of the facility 100. Moreover, such an embodiment can reduce the overhead of data communications with other devices of the facility 100, including the other RSDs 108 and the FSCS 106 of the facility 100. In some embodiments, a RSD 108 can communicate with external entities to acquire and disseminate relevant information. For example, a RSD 108 may receive information from an external entity, such as current and forecast weather conditions from an external weather provider and/or reports of emergency response personnel availability (e.g., firefighter and emergency medical services (EMS) availability) from an emergency response provider, and forward the received information to other entities in the facility 100, such as other RSDs 108 and/or the FSCS 106, by way of the communications schemes described here.

Figure 2B:
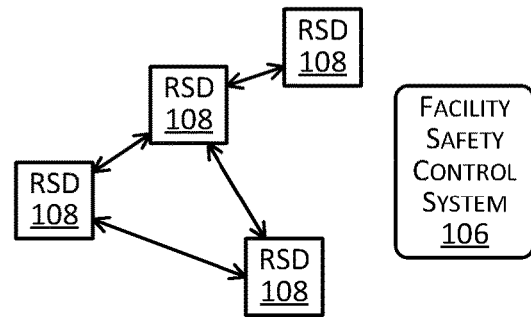
FIG. 2B is a diagram that illustrates RSDs of an industrial facility operating in a mesh configuration in accordance with one or more embodiments.

In some embodiments, some or all of the RSDs 108 of the facility 100 operate in a mesh configuration, sharing data with one another. FIG. 2B is a diagram that illustrates RSDs 108 of the facility 100 operating in a mesh configuration in accordance with one or more embodiments. In a mesh configuration, there may be intercommunication between the RSDs 108 and no intercommunication between the RSDs 108 and the FSCS 106, as illustrated by the arrows extending between the RSDs 108 and the lack of arrows extending between the RSDs 108 and the FSCS 106. In some embodiments, a RSD 108 operating in a mesh configuration obtains sensor data 138 locally and/or remotely (e.g., the RSD 108 may collect sensor data 138 from the sensors of the sensing unit 120 of the RSD 108 and/or receive sensor data 138 collected and/or forwarded by another RSD 108), shares the obtained sensor data 138 with other RSDs 108 (e.g., the RSD 108 may send the sensor data 138 it has collected and/or received to another RSD 108), processes the sensor data 138 locally (e.g., the RSD 108 may process the sensor data 138 it has collected and/or received at the processing unit 122 of the RSD 108), shares the results of the processing, such as alerts 140, with other RSDs 108 (e.g., the RSD 108 may send alerts 140 determined by the processing to another RSD 108 and/or receive alerts 140 resulting from processing by another RSD 108, from the other RSD 108), and/or presents local alerts (e.g., the RSD 108 may present alerts 140 determined by the RSD 108 and/or alerts received from other RSDs 108 locally, by way of it alert unit 128). This may be done, for example, independent of communications by way of the FSCS 106. Such independent operations may provide robust RSDs 108 that can operate independent of an ability to establish communication with the FSCS 106 of the facility 100. Moreover, such an embodiment can reduce the overhead of data communications with the FSCS 106 of the facility 100.

Figure 2C:
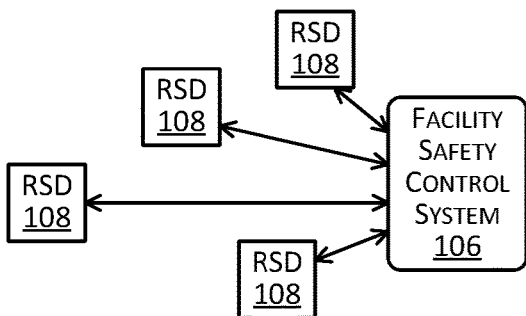
FIG. 2C is a diagram that illustrates RSDs of an industrial facility operating in a distributed configuration in accordance with one or more embodiments.

In some embodiments, some or all of the RSDs 108 of the facility 100 operate in a distributed (or "direct) configuration, communicating by way of the FSCS 106. FIG. 2C is a diagram that illustrates RSDs 108 of the facility 100 operating in a distributed (or "direct") configuration in accordance with one or more embodiments. In a distributed configuration, there may be intercommunication between the RSDs 108 and the FSCS 106 and no intercommunication between the RSDs 108, as illustrated by the arrows extending between the RSDs 108 and the FSCS 106 and the lack of arrows extending between the RSDs 108. In some embodiments, a RSD 108 operating in a distributed configuration obtains sensor data 138 locally (e.g., the RSD 108 may collect sensor data 138 from the sensors of the sensing unit 120 of the RSD 108), forwards the acquired sensor data 138 to the FSCS 106 (e.g., the RSD 108 may send the sensor data 138 it has obtained to the FSCS 106), the FSCS 106 may process the sensor data 138 locally (e.g., the FSCS 106 may process the sensors data 138 collected from one or more of the RSDs 108 locally at the processing unit 130 to determine whether an alert condition exits, and any corresponding alerts 140), and/or the FSCS 106 may distribute the results of the processing, including any relevant corresponding alerts 140, to the RSDs 108 (e.g., the FSCS 106 may send a first alert 140 for a first safety issue to a first RSD 108 determined to be associated with the first safety issue and send a second alert for a second safety issue to a second RSD 108 determined to be associated with the second safety issue). The RSDs 108 may present any relevant alerts received (e.g., the first RSD 108 may present the first alert locally, by way of its alert unit 128, and the second RSD 108 may present the second alert locally, by way of its alert unit 128). This may be done, for example, with or without intercommunication between the RSDs 108 themselves. In some embodiments, the FSCS 106 communicates safety information 136 to RSDs 108 by way of unicast communication, multicast communication and/or broadcast communication. A unicast communication may include the FSCS 106 communicating information for receipt by a specific-individual RSD 108 of available RSDs 108. A multicast communication may include the FSCS 106 communicating information for receipt by a specific subset of two or more RSDs 108 of all available RSDs 108. A broadcast communication may include the FSCS 106 communicating information broadly for receipt by all available RSDs 108. Such centrally controlled processing may ensure a single, consistent interpretation of the sensor data 138 and/or the execution of a coordinated set of alerts 140 across the RSDs 108. Moreover, such an embodiment can reduce the overhead of processing at the RSDs 108 by off-loading processing to the FSCS 106, and reducing the "hops" that may otherwise need to be performed to relay communications by way of intermediate RSDs 108.

Figure 2D:
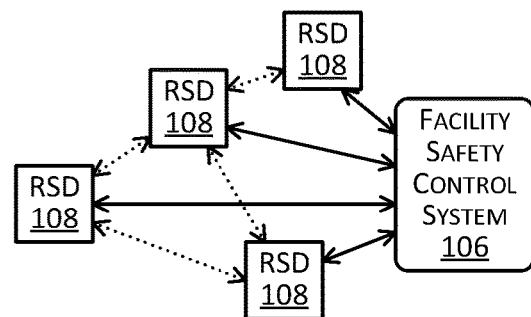
FIG. 2D is a diagram that illustrates RSDs of an industrial facility operating in a distributed-mesh configuration in accordance with one or more embodiments.

In some embodiments, some or all of the RSDs 108 of the facility 100 operate in a distributed-mesh (or "hybrid") configuration, communicating with one another directly in a manner similar to that described with regard to the mesh configuration and/or indirectly by way of the FSCS 106 in a manner similar to that described with regard to the distributed configuration. FIG. 2D is a diagram that illustrates RSDs 108 of the facility 100 operating in a distributed-mesh configuration in accordance with one or more embodiments. In a distributed-mesh configuration, there may be intercommunication between the RSDs and the FSCS 106 and intercommunication between the RSDs 108, as illustrated by the arrows extending between the RSDs 108 and the FSCS 106 and the dotted arrows extending between the RSDs 108. In some embodiments, a RSD 108 operating in a distributed-mesh configuration obtains sensor data 138 locally and/or remotely (e.g., the RSD 108 may collect sensor data 138 from the sensors of the sensing unit 120 of the RSD 108 and/or receive sensor data 138 collected and/or forwarded by another RSD 108), forwards the acquired sensor data 138 to the FSCS 106 (e.g., the RSD 108 may send the sensor data 138 it has obtained to the FSCS 106), the FSCS 106 may process the sensor data 138 locally (e.g., the FSCS 106 may process the sensors data 138 collected from one or more of the RSDs 108 locally at the processing unit 130 to determine whether an alert condition exits, and any corresponding alerts 140), and/or the FSCS 106 may distribute the results of the processing, including any relevant corresponding alerts 140, to the RSDs 108 (e.g., the FSCS 106 may send a first alert 140 for a first safety issue to a first RSD 108 determined to be associated with the first safety issue and send a second alert for a second safety issue to a second RSD 108 determined to be associated with the second safety issue). The FSCS 106 may identify RSDs 108 associated with particular issues based on a predefined association and/or learned associations. For example, if the FSCS 106 determines that a particular RSD 108 experiences a first safety issue at least a threshold number of times, the FSCS 106 may associate the RSD 108 with the first safety issue, such that alerts 140 relating to the first safety issue are sent to the first RSD 108. In some embodiments, the RSD 108 also shares safety information 136, such as acquired sensor data 138 and/or alerts 140, with one or more other RSDs 108 (e.g., the RSD 108 may send the sensor data 138 it has collected and/or received, and/or alerts 140 it has determined and/or received, to another RSD 108). The RSDs 108 may present any relevant alerts received (e.g., the first RSD 108 may present the first alert locally, by way of its alert unit 128, and the second RSD 108 may present the second alert locally, by way of its alert unit 128). As described herein, the sharing of safety information 136 from one RSD 108 to one or more other RSDs 108 may be employed in response to the RSD 108 not being able to establish a reliable, direct communication channel with the FSCS 106. In such an embodiment, one or more intermediate RSDs 108 may act as intermediary nodes to relay the safety information 136 from the RSD 108 to the FSCS 106. Such a distributed-mesh configuration may combine certain benefits of distributed configurations and mesh configurations. For example, a distributed-mesh configuration may, provide centrally controlled processing that can ensure a single, consistent interpretation of the sensor data 138 and/or the execution of a coordinated set of alerts 140 across the RSDs 108, when possible. Moreover, such an embodiment can reduce the overhead of processing at the RSDs 108 by off-loading processing to the FSCS 106, and reducing the "hops" that may otherwise need to be performed to relay communications by way of intermediate RSDs 108, when possible. Further the distributed-mesh configuration may, when needed, enable independent operations to provide robust RSDs 108 that can operate independent of an ability to establish direct communication, or even indirect communication, with the FSCS 106 of the facility 100.

In some embodiments, such as in a mesh configuration or a distributed-mesh configuration, RSDs 108 provide safety information 136, such as collected safety data 138 and/or alerts 140, to other RSDs 108. For example, a RSD 108 may collect safety data 138 for various sensed characteristics of the environment surrounding the RSD 108 (e.g., including characteristics of a person or device the RSD 108 is attached to) the RSD 108 may process the collected safety data 138 locally to determine whether an alert condition exists, and, in response to determining that an alert condition exists, the RSD 108 may present a corresponding alert 140 locally and/or communicate safety information 136, including the alert 140 and/or the safety data 138 collected, to other RSDs 108 that are in communication range (or "in range") of the RSD 108 (e.g., in wireless communication range of the RSD 108 such that the RSD 108 can establish a wireless communication channel with the other RSDs 108 and transmit the safety information 136 to the other RSDs 108 by way of the established wireless communication channel). The other RSDs 108 receiving the safety information 136 may each, in-turn, present the alert 140 locally, process the safety data 138 locally, and/or communicate the safety information 136, including the alert 140 and/or the safety data 138, to other RSDs 108 that are in range of that RSD 108. Such an embodiment may enable the RSDs 108 of facility 100 to quickly disseminate critical safety information 136 (e.g., including safety data 138 and/or alerts 140) to nearby RSDs 108, thereby affording persons 110 and/or devices 112 wearing the mobile RSDs 108 (or in the vicinity of a fixed RSD 108) with an opportunity to immediately respond to the alerts 140. Such an embodiment may enhance robustness of the ISS 102 by enabling the communication of safety information 136 (e.g., including safety data 138 and/or alerts 140) even when traditional communication paths, such as direct communication paths between the RSDs 108 and the FSCS 106, are not available.

In some embodiments, such as in a distributed-mesh configuration, RSDs 108 communicate safety information 136, such as collected safety data 138 and/or alerts 140, with other RSDs 108 and/or the FSCS 106, based on available communication channels. For example, when communicating safety information 136, a first RSD 108 may initially attempt to establish communication with the FSCS 106. If communication with the FSCS 106 can be established, the first RSD 108 may then communicate the safety information 136 to the FSCS 106. If, however, communication with the FSCS 106 cannot be established, the first RSD 108 may then attempt to establish communication with another RSD 108. If communication with a second RSD 108 is established then the first RSD 108 may communicate the safety information 136 to the second RSD 108. A similar process can be repeated by the second RSD 108 and, if needed, by other RSDs 108, to relay the safety information 136 from the first RSD 108 to the FSCS 106 by way of the one or more intermediate RSDs 108. Such an embodiment may enhance robustness of the ISS 102 by enabling the communication of safety information 136 between RSDs 108 and the FSCS 106 by way of intermediate RSDs 108 acting as intermediate communication nodes, even when traditional communication paths, such as a direct communication path between the first RSD 108 and the FSCS 106, are not available.

In some embodiments, RSDs 108 communicate safety information 138 to another RSD 108 based on characteristics of the other RSD 108, such as a power level of the other RSD 108 and/or proximity of the other RSD 108 to the FSCS 106. For example, if a first RSD 108 determines that direct communication with the FSCS 106 cannot be established, and that multiple other RSDs 108 are in range, it may query each of the other RSDs 108 in range for proximity information indicating the proximity of the RSD 108 to the FSCS 106 (e.g., a number of "hops" from the RSD 108 to the FSCS 106, with 1 hop being a direct connection to the FSCS 106, 2 hops being a connection to the FSCS 106 by way of a single intermediary RSD 108, and so forth) and/or for power information indicating a current power level of the RSD 108 (e.g., the voltage level of a battery of the RSD 108). In some embodiments, proximity of a RSD 108 may be determined based on a preconfigured assignment of the RSD 108, a geographic location of the RSD 108 (e.g., determined by way of a GPS location of the RSD 108), signal strength between the RSD 108 and the FSCS 106, by a dynamic "hop query" and/or the like. For example, a RSD 108 may issue a dynamic hop query to other RSDs 108 in range, requesting that they report the number of hops between themselves and the FSCS 106, and the RSD 108 may determine its own proximity by adding a "hop" to the lowest number of hops reported by the other RSDs 108 in range. In some embodiment, the FSCS 106 may periodically (e.g., every 1 minute, 5 minute, 10 minute, 1 hour or the like) issue a central dynamic hop query to each of RSDs 108 to determine the number of hops between the FSCS 106 and each of the RSDs 108, the FSCS may 106 may store a hop table listing of the number of hops for each of the RSDs 108, and/or the FSCS 106 may broadcast the hop table to the RSDs 108, and the RSDs 108 may use the hop-table to determine the proximity of itself and/or other RSDs 108 to the FSCS 106. In some embodiments, the first RSD 108 may determine which, if any, of the other RSDs 108 in range have a power level above a threshold power level and are closest to the FSCS 106. If a single RSD 108 is closest to the FSCS 106 and has a power level above the threshold power level (e.g., the RSD 108 is within 1 hop, and the other RSDs 108 in range are within 2 hops or greater, or do not have a power level above the threshold power level), then the RSD 108 may communicate the safety information 136 to the single RSD 108. If, however, multiple ones of the closest RSDs 108 have a power level above the threshold power level and are the same proximity to the FSCS 106 (e.g., a second and a third RSD 108 both within 1 hop, and having a power level above the threshold power level), the first RSD 108 may determine which of the multiple ones of the closest RSDs 108 having a power level above a threshold power level has the highest power level, and communicate the safety information 136 to the RSD 108 having the highest power level. If the RSD 108 determines that none of the other RSDs 108 in range have a power level above the threshold power level, the RSD 108 may send the safety information 136 to the RSD 108 determined to have the highest power level and/or broadcast the safety information 136 so that it can be received by any of the RSDs 108 in range. A similar process can be repeated by the RSD 108 receiving the safety information from the first RSD 108 and, if needed, by other RSDs 108, to relay the safety information 136 from the first RSD 108 to the FSCS 106 by way of the one or more intermediate RSDs 108 acting as intermediate communication nodes to complete the communication. Such an embodiment may help to optimize power of RSDs 108 by avoiding relaying the safety information 136 using RSDs 108 that already have a relatively low power supply which could be further depleted by relaying the safety information 136 and, instead, employing RSDs 108 that have sufficient power to provide the relay of the safety information 136. Further, such an embodiment may employ a relatively short path to the FSCS 106 to reduce the number of relays required to transmit the safety information 136 from the first RSD 108 to the FSCS 106, saving both time and power associated with communicating the safety information 136 from the first RSD 108 to the FSCS 106.

Figure 3A:
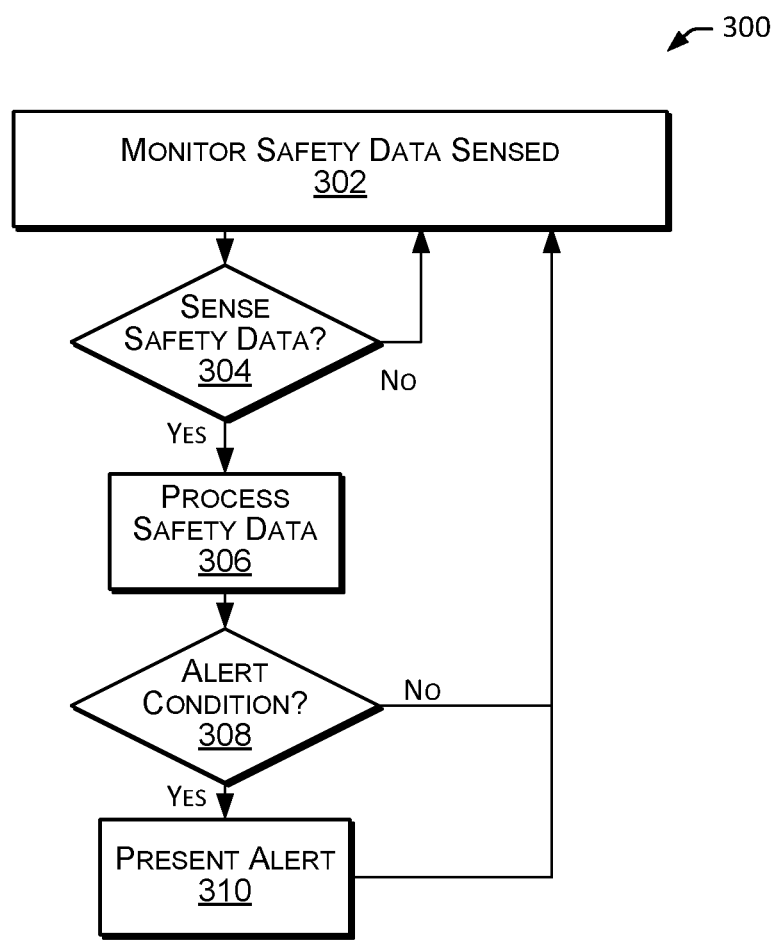
FIG. 3A is a diagram that illustrates a method of operating a remote sensing device (RSD) in a standalone configuration in accordance with one or more embodiments.

FIG. 3A is a diagram that illustrates a method 300 of operating a RSD 108 in a standalone configuration in accordance with one or more embodiments. The method 300 may be executed, for example, by the processing unit 122 of the RSD 108. In some embodiments, the RSD 108 monitors for safety data sensed (block 302). This can include, for example, the RSD 108 monitoring safety data 138 sensed via the sensing unit 120 of the RSD 108. In response to sensing safety data (block 304), the RSD 108 may process the safety data (block 306). This can include, for example, the RSD 108 processing the safety data 138 locally to determine whether an alert condition exists (block 308). In response to determining that an alert condition exists, the RSD 108 may present an alert (block 310). This can include the RSD 108 generating an alert 140 corresponding to the alert condition and/or presenting the alert 140 locally, via the alert unit 128 of the RSD 108. The alert 140 can include, for example, an audible and/or visual alert, such as those described herein (e.g., including lights, sirens and/or instructions). In some embodiments, in response to not sensing safety data (block 304), determining that an alert condition does not exists (block 308), or after presenting an alert (block 310), the RSD 108 may return to monitoring for safety data sensed (block 302).

Figure 3B:
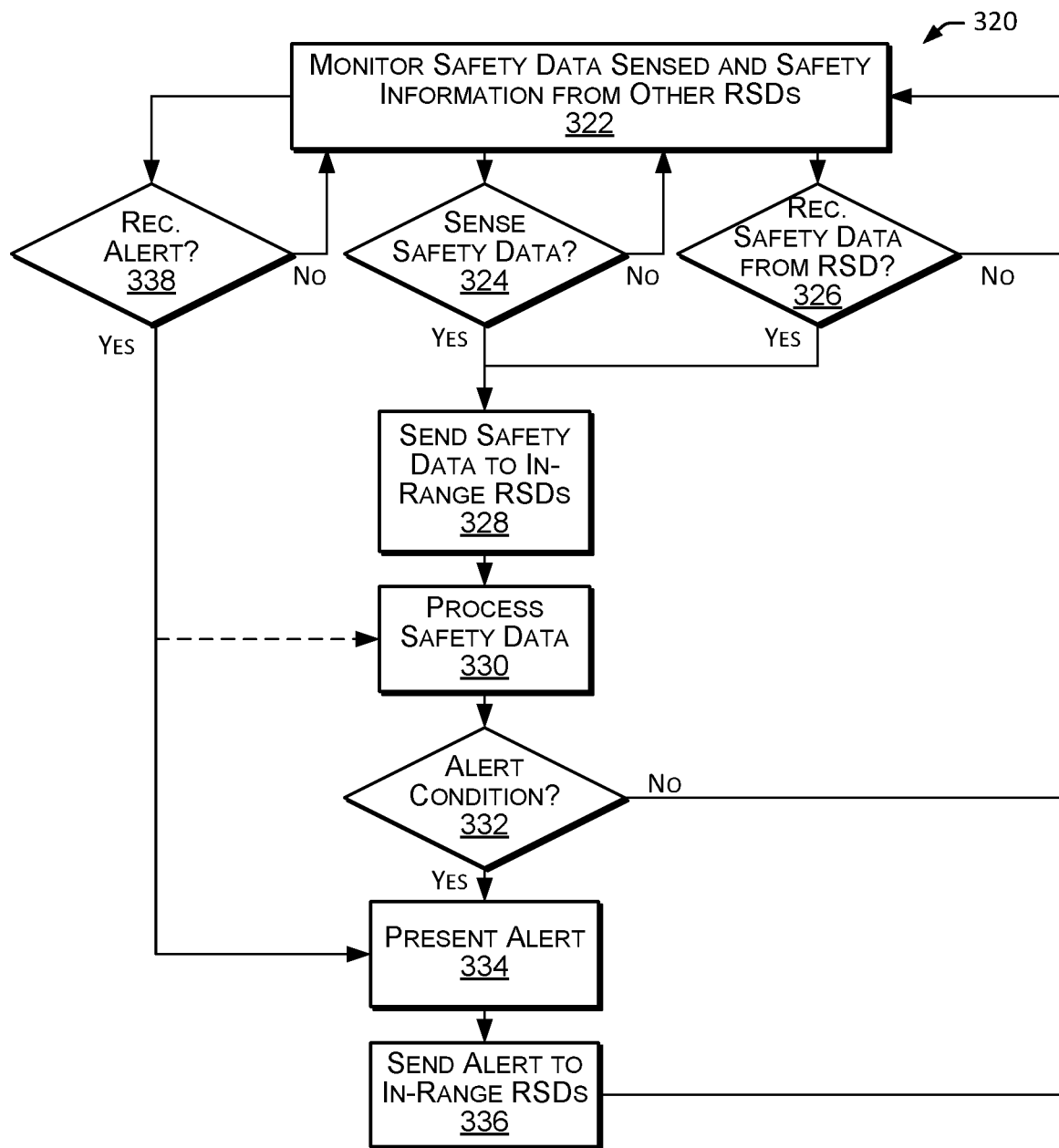
FIG. 3B is a diagram that illustrates a method of operating a RSD in a mesh configuration in accordance with one or more embodiments.

FIG. 3B is a diagram that illustrates a method 320 of operating a RSD 108 in a mesh configuration in accordance with one or more embodiments. The method 320 may be executed, for example, by the processing unit 122 of the RSD 108. In some embodiments, the RSD 108 monitors for safety data sensed and safety information from other RSDs (block 322). This can include, for example, the RSD 108 monitoring "local" safety data 138 sensed via the sensing unit 120 of the RSD 108 and "remote" safety information (e.g., safety data 138 and/or alerts 140) received from other RSDs 108 in range. In response to sensing safety data (block 324) and/or receiving safety data from another RSD 108 (block 326), the RSD 108 may send the safety data to in range RSDs 108 (block 328). This can include the RSD 108 broadcasting the obtained safety data 138, including the sensed "local" safety data 138 and/or the received "remote" safety data 138, for receipt by other RSDs 108 that are in communication range of the RSD 108 (e.g., to relay the safety data 138 to other RSDs 108). In some embodiments, the RSD 108 may process the safety data (block 330). This can include, for example, the RSD 108 processing the obtained safety data 138, including the sensed local safety data 138 and/or the received remote safety data 138, locally to determine whether an alert condition exists (block 332). In response to determining that an alert condition exists, the RSD 108 may present an alert (block 334). This can include the RSD 108 generating an alert 140 corresponding to the alert condition determined and/or presenting the alert 140 locally, via the alert unit 128. The alert 140 can include, for example, an audible and/or visual alert, such as those described herein (e.g., including lights, sirens and/or instructions). In some embodiments, the RSD 108 may send the alert to in range RSDs 108 (block 336). This can include the RSD 108 broadcasting the alert 140 for receipt by other RSDs 108 that are in communication range of the RSD 108 (e.g., to relay the alert 140 to other RSDs 108). In some embodiments, in response to receiving an alert (block 338), the RSD 108 may proceed to present the alert (block 334) and/or send the alert to in range RSDs 108 (block 336). This can include the RSD 108 receiving an alert 140 broadcast from an in range RSD 108, and proceeding to present the alert 140 (e.g., if it is determined to be relevant to the RSD 108) and/or proceeding to broadcast the alert 140 for receipt by other RSDs 108 that are in communication range of the RSD 108 (e.g., to relay the alert 140 to the other RSDs 108). In some embodiments, in response to receiving an alert 140 (block 338), the RSD 108 may proceed to processing the alert 140 as safety data (block 330) to further assess the content of the alert 140, and make its own assessment of whether the alert 140 rises to the level of an alert condition (block 332). In some embodiments, in response to not sensing safety data (block 324), not receiving safety data (block 326), determining that an alert condition does not exists (block 332), or after presenting an alert (block 334) and/or sending the alert 140 to in range RSDs 108, the RSD 108 may return to monitoring for safety data sensed (block 322).

Figure 3C:
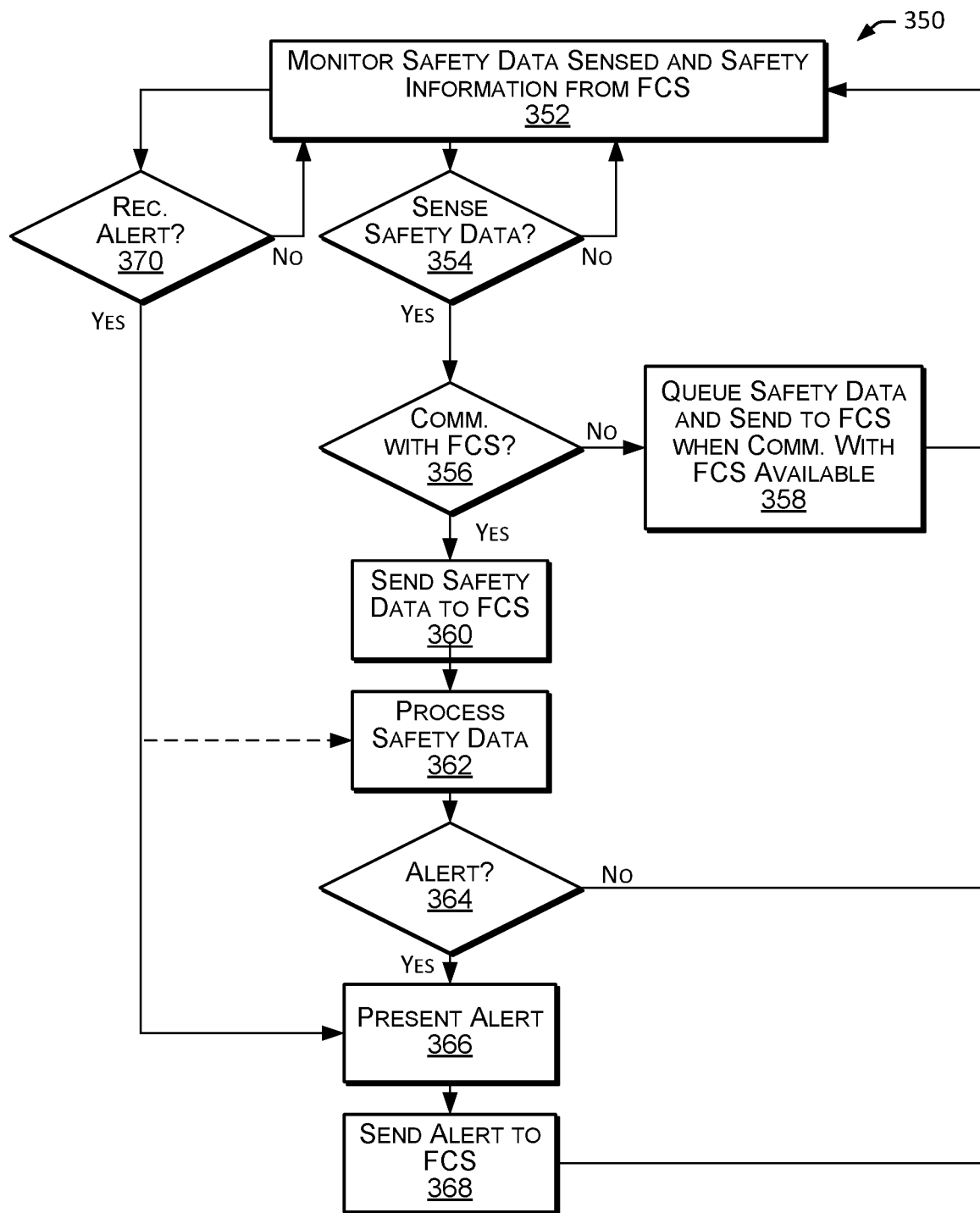
FIG. 3C is a diagram that illustrates a method of operating a RSD in a distributed configuration in accordance with one or more embodiments.

FIG. 3C is a diagram that illustrates a method 350 of operating a RSD 108 in a distributed configuration in accordance with one or more embodiments. The method 350 may be executed, for example, by the processing unit 122 of the RSD 108. In some embodiments, the RSD 108 monitors for safety data sensed and safety information received from the FSCS 106 (block 352). This can include, for example, the RSD 108 monitoring "local" safety data 138 sensed via the sensing unit 120 of the RSD 108 and "remote" safety information 136 (e.g., safety data 138 and/or alerts 140) received from the FSCS 106. Receipt of the safety information 136 may include receipt of a "wakeup" signal to activate the RSD 108. In response to sensing safety data (block 354), the RSD 108 may determine whether communication with the FSCS 106 is available (block 356). Such a conditional response may reduce power consumption, as the RSD 108 may operate in a relatively low-power state until receipt of the safety information 136 (e.g., including a wakeup signal), and may then transition into a relatively high-power active state in which it assesses the state of communication with the FSCS 106. In response to determining that communication with the FSCS 106 is not available, the RSD 108 may queue the sensed safety data 138 (e.g., store the safety data 138 in a memory 124 of the RSD 108) and send the queued safety data 138 to the FSCS 106 when communication with the FSCS 106 is available (block 358). In some embodiments, in response to determining that communication with the FSCS 106 is not available, the RSD 108 may reconfigure itself into another mode of operation to enable communication of the safety data 138, such as a meshed configuration. In response to determining that communication with the FSCS 106 is available, the RSD 108 may send the safety data 138 to the FSCS 106 (block 360). This can include the RSD 108 sending the safety date 138 directly to the FSCS 106 by way of a direct communication channel established there between. In some embodiments, the RSD 108 may process the safety data (block 362). This can include, for example, the RSD 108 processing the sensed safety data 138 locally to determine whether an alert condition exists (block 364). In response to determining that an alert condition exists, the RSD 108 may present an alert (block 366). This can include the RSD 108 generating an alert 140 corresponding to the alert condition and/or presenting the alert 140 locally, via the alert unit 128. The alert 140 can include, for example, an audible and/or visual alert, such as those described herein (e.g., including lights, sirens and/or instructions). In some embodiments, the RSD 108 may send the alert to the FSCS 106 (block 368). In some embodiments, in response to receiving an alert (block 370), the RSD 108 may proceed to present the alert (block 366). This can include the RSD 108 receiving an alert 140 from the FSCS 106, and proceeding to present the alert 140 locally, via the alert unit 128. In such an embodiment, the RSD 108 may not send the received alert 140 back to the FSCS 106. In some embodiments, in response to receiving an alert 140 (block 370), the RSD 108 may proceed to processing the alert 140 as safety data (block 362) to further assess the content of the alert 140, and make its own assessment of whether the alert 140 rises to the level of an alert condition (block 364). In some embodiments, in response to not sensing safety data (block 354), not receiving an alert (block 370), determining that an alert condition does not exists (block 364), or after presenting an alert (block 366) and/or sending the alert 140 to the FSCS 106, the RSD 108 may return to monitoring for safety data sensed (block 352).

Figure 3D:
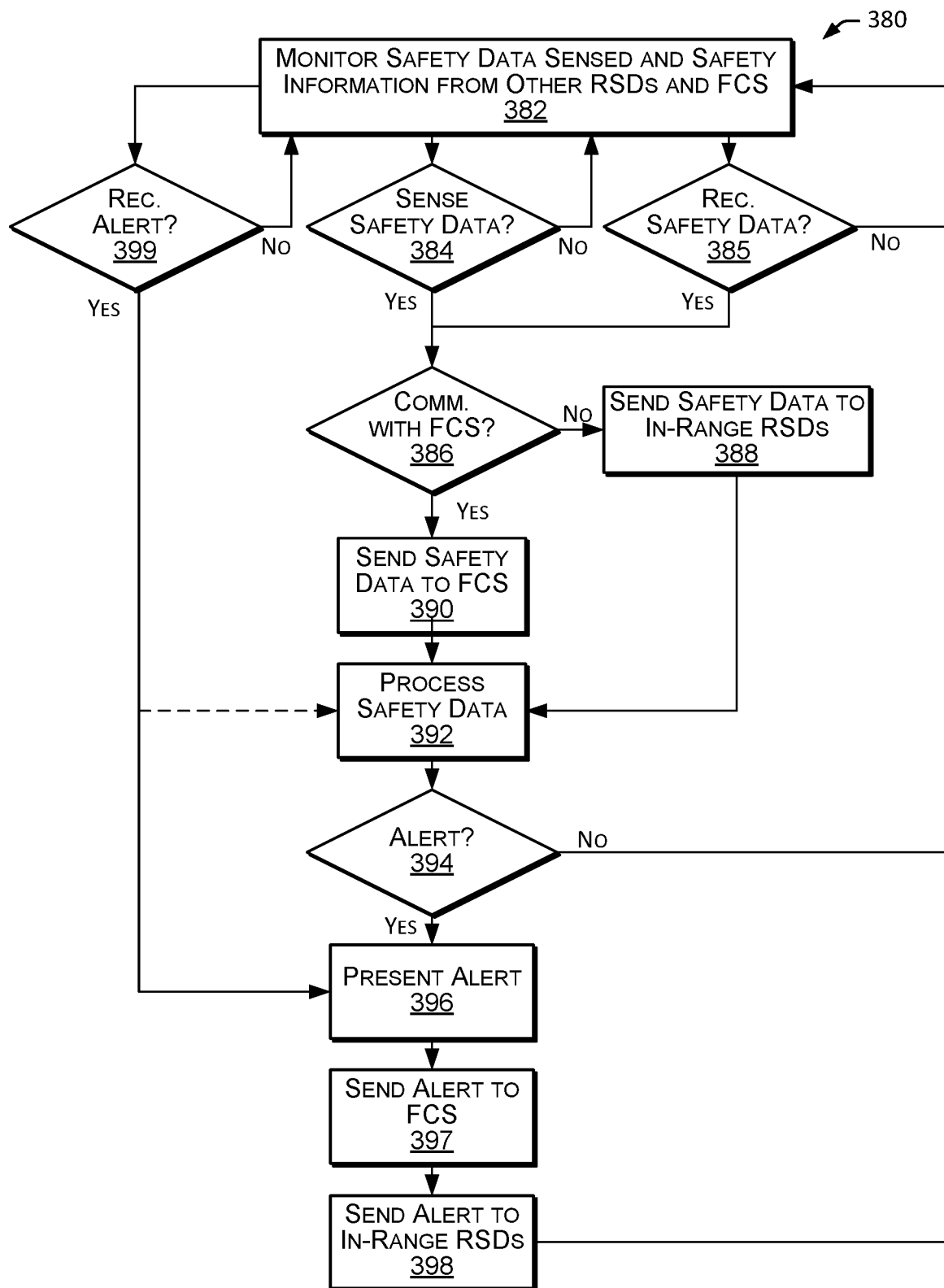
FIG. 3D is a diagram that illustrates a method of operating a RSD in a distributed-mesh configuration in accordance with one or more embodiments.

FIG. 3D is a diagram that illustrates a method 380 of operating a RSD 108 in a distributed-mesh configuration in accordance with one or more embodiments. The method 380 may be executed, for example, by the processing unit 122 of the RSD 108. In some embodiments, the RSD 108 may monitor for safety data sensed and safety information from other RSDs and/or the FSCS 106 (block 382). This can include, for example, the RSD 108 monitoring "local" safety data 138 sensed via the sensing unit 120 of the RSD 108 and "remote" safety information (e.g., safety data 138 and/or alerts 140) received from other RSDs 108 in range and/or the FSCS 106. In response to sensing safety data (block 384) and/or receiving safety data from another RSD 108 (block 385), the RSD 108 may determine whether communication with the FSCS 106 is available (block 386). In response to determining that communication with the FSCS 106 is not available, the RSD 108 may send the obtained safety data to in range RSDs 108 (block 388). This can include the RSD 108 broadcasting the sensed and/or received safety data 138, including the sensed "local" safety data 138 and/or the received "remote" safety data 138, for receipt by other RSDs 108 that are in communication range of the RSD 108 (e.g., to relay the safety data 138 to other RSDs 108). In response to determining that communication with the FSCS 106 is available, the RSD 108 may send the safety data 138 to the FSCS 106 (block 390). In some embodiments, the RSD 108 may process the safety data (block 392). This can include, for example, the RSD 108 processing the sensed safety data 138 locally to determine whether an alert condition exists (block 394). In response to determining that an alert condition exists, the RSD 108 may present an alert (block 396). This can include the RSD 108 generating an alert 140 corresponding to the alert condition and/or presenting the alert 140 locally, via the alert unit 128. The alert 140 can include, for example, an audible and/or visual alert, such as those described herein (e.g., including lights, sirens and/or instructions). In some embodiments, the RSD 108 may send the alert to the FSCS 106 (block 397) and/or to in range RSDs 108 (block 398). In some embodiments, in response to receiving an alert (block 399), the RSD 108 may proceed to present the alert (block 396). This can include the RSD 108 receiving an alert 140 from the FSCS 106 and/or another RSD 108, and proceeding to present the alert 140 locally, via the alert unit 128. In such an embodiment, the RSD 108 may not send an alert 140 received from the FSCS 106 back to the FSCS 106 and may not send an alert 140 received from a RSD 108 back to the RSD 108 in an effort to reduce network traffic. In some embodiments, in response to receiving an alert 140 (block 399), the RSD 108 may proceed to processing the alert 140 as safety data (block 392) to further assess the content of the alert 140, and make its own assessment of whether the alert 140 rises to the level of an alert condition (block 394). In some embodiments, in response to not sensing safety data (block 384), not receiving safety data (block 385), not receiving an alert (block 399), determining that an alert condition does not exists (block 394), or after presenting an alert (block 396) and/or sending the alert 140 to the FSCS 106 (block 397) and/or to in range RSDs 108 (block 398), the RSD 108 may return to monitoring for safety data sensed and safety information (block 382).

In some embodiments, presentation (or "execution") of an alert 140 includes an audible and/or visual representation of the alert. For example, presentation of an alert 140 by a RSD 108 can include the RSD 108 providing a siren and/or a flashing light. Such presentation of an alert 140 may alert nearby persons 110 to the alert condition and/or can facilitate locating a person 110, device 112 or equipment 104 associated with the RSD 108 that is the subject of the alert 140. For example, in the case of a fire, a RSD 108 worn by a person 110 that emits a siren and flashing light can enable a firefighter or other response personnel to locate the person 110. In some embodiments, an alert 140 presented by a RSD 108 includes a "local" alert 140 generated by the RSD 108 based on processing of local data 138 and/or remote safety information 136, or a "remote" alert 140 received by the RSD 108 from an in range RSD 108 (e.g., relayed to the RSD 108 from another RSD 108 or the FSCS 106) or from the FSCS 106 (e.g., via direct communication with the FSCS 106).

In some embodiments, the contents of an alert 140 includes suggested actions or instructions for taking actions to respond to the corresponding alert condition. For example, presentation of an alert 140 by a RSD 108 can include the RSD 108 providing instructions for operating nearby equipment to resolve the source of the alert 140 (e.g., "Close valve 1 to stop the ongoing gas leak"). As a further example, presentation of an alert 140 by a RSD 108 can include the RSD 108 providing instructions for evacuating an area or otherwise navigating away from a dangerous condition. This can include, for example, directions for navigating around a potentially hazardous area (e.g., "Move immediately to Area 1 by way of Area 2 and Area 4; Avoid Areas 3 and 5"). In some embodiments, such an alert 140 is presented visually and/or audibly. For example, the RSD 108 may provide display of a map of the facility 100 and/or a route for navigating around the potentially hazardous area, such as a map depicting areas 1-7, an icon indicating the current position of the RSD 108, highlighting Areas 3 and 5 in red, highlighting Area 1 in green, and highlighting a route through Areas 2 and 4 in blue. As a further example, the RSD 108 may also provide audible instructions for navigating around potentially hazardous area, such as broadcasting via a speaker, the instructions "Move immediately to Area 1 by way of Area 2 and Area 4 . . . Avoid Areas 3 and 5". In some embodiments, alerts 140 can be provided throughout the facility 100. For example, a first color of lights may be activated in the potentially hazardous area (e.g., red flashing lights illuminated in Areas 3 and 5), a second color of lights may be activated along a route to safe zone (e.g., blue flashing lights in Areas 2 and 4), and a third color of lights may be activated in the safe zone (e.g., green flashing lights in Area 1). In some embodiments, lights may be illuminated sequentially to illustrate a path for persons to follow to the safe zone. For example, a blue flashing lights may be illuminated in sequence one after the other along the route through Areas 2 and 4, to guide persons to Area 1 by following the sequential illumination of the lights. In some embodiments, presentation of an alert 140 can include instructions for assisting one or more persons. For example, if a first RSD 108 worn by a person 110 senses that the person 110 has fallen, is exposed to a gas and is not moving, or is otherwise experiencing a potentially hazardous situation, an alert 140 can be provided to one or more other nearby mobiles RSD 108 determined to be within range of the RSD 108, and presentation of the alert 140 can include directions for navigating to the person 110 (e.g., in a similar manner as providing a route to a safe zone) and/or instructions for assisting the person 110. In some embodiments, it can be determined for each of one or more RSDs 108, whether suggested actions of an alert 140 sent to the RSD 108 would expose a person associated with the RSD 108 to a risk at or above a threshold level, and the alert 140 may be provided to RSDs 108 for which it is determined that the suggested action of the alert 140 would not expose the persons associated with the RSDs 108 to a risk at or above the threshold level, and the alert 140 may not be provided to RSDs 108 for which it is determined that the suggested action of the alert 140 would expose the persons associated with the RSDs 108 to a risk at or above the threshold level. The instructions can include instructions of how to evaluate the status of the person 110 (e.g., "Ask the person if they are having trouble breathing"), instructions to treat any medical issues experienced by the person 110 (e.g., "If the person is having trouble breathing, administer oxygen via a portable oxygen unit and wait for medical responders to arrive"), and/or instructions to move the person 110 out of the area (e.g., "If the person is breathing comfortably, move them to Area 1 for further treatment").

In some embodiments, alerts 140 issued to a RSD 108 may be based on the location of the RSD 108. For example, an alert 140 may include different instructions for RSDs 108 in different locations. In the case of an alert 140 including directions for navigating around a potentially hazardous area, alerts 140 provided to RSDs 108 may provide safe and efficient routes for evacuating from the respective positions of the RSDs 108. For example, alerts 140 issued to one or more RSDs 108 determined to be in Area 2 may include instructions to follow a first path for evacuating the area (e.g., "Move immediately to Area 1 by way of Area 4"), and alerts 140 issued to one or more RSDs 108 determined to be in Area 6 may include instructions to follow a second path for evacuating the area (e.g., "Move immediately to Area 9 by way of Area 7 and Area 8").

In some embodiments, the contents of an alert 140 is based on characteristics of the safety issue that is the source of the alert 140. For example, in the case of receiving safety information 136 indicating a hazardous gas being detected, and determining that the hazardous gas is relatively heavy (and thus concentrates in relatively low locations, such as those near the ground), the presentation of the corresponding alert 140 may include an indication of the type of gas leak and provide instructions for persons to remain standing and keep their heads elevated to avoid inhaling the gas.

In some embodiments, the contents of an alert 140 is based on characteristics of the safety issue that is the source of the alert 140, and determinations as to how the safety issue will evolve. For example, in the case of receiving safety information 136 indicating a hazardous gas being detected at a first location (e.g., hazardous gas being detected in Area 3), wind speed and direction data for the location (e.g., a Northwest wind of 3 miles per hour) can be used to determine or predict that the gas has or will spread into a downwind location (e.g., to predict that the gas has or will spread into Area 5 which is located Southeast of Area 3). As a result, alerts 140 can be communicated to RSDs 108 determined to be located at or near the affected locations (e.g., alerts can be communicated to RSDs 108 determined to be located in affected Areas 3 and 5). Such an embodiment can enable the system 106 to proactively present alerts 140 to persons 110 located in areas that are determined or predicted to be affected, but at which a local safety issue not yet been sensed or determined.

In some embodiments, a RSD 108 generates alerts 140 based on locally sensed safety data 138 and/or safety data 138 obtained by way of other RSDs 108. For example, in an instance in which a first RSD 108 does not establish communication with a central controller (e.g., the RSD 108 is operating a local processing mode, or reliable communication with the FSCS 106 cannot be established), the first RSD 108 may obtain safety information 136 from other RSDs 108 in range (e.g., including safety data 138 acquired by and/or alerts 140 generated by the other RSDs 108) and process the safety information 136 locally to determine what, if any, alert 140 should be generated by the first RSD 108. As an example, upon the first RSD 108 determining that a gas leak has occurred at or near the first RSD 108 (e.g., by way of the first RSD 108 sensing the concentration of the gas at the first RSD 108 and/or the first RSD 108 receiving safety information 136 from another RSD 108 indicating the gas leak), the first RSD 108 may, then, query the other RSDs 108 in range for safety information 136 (e.g., including safety data 138 including an indication of the concentration of gases sensed by the other RSDs 108 and the location of the other RSDs 108), and upon the first RSD 108 receiving the safety information 136, the first RSD 108 may process the safety information 136 received to determine the locations and concentrations of the gas (e.g., process the safety information 136 received to determine the locations and concentrations of the gas to determine that Areas 3 and 5 have relatively high concentrations of the gas and that Areas 2 and 4 have relatively low or no concentrations of the gas), the first RSD 108 may determine a route for moving to a safe zone that includes passing through locations with the least gas concentrations (e.g., a route to a safe zone in Area 1 by way of Area 2 and Area 4), and the first RSD 108 may issue a corresponding local alert 140 (e.g., the first RSD 108 may display or audibly recite directions to "Move immediately to Area 1 by way of Area 2 and Area 4 . . . Avoid Areas 3 and 5" along with a graphical depiction of the route, as described herein). In some embodiments, a RSD 108 or the FSCS 106 can communicate directly with devices 104 of the facility 100 to control operation of the devices 104. For example, in the event the RSD 108 determines that a leak is occurring in a first region controlled by a first valve, the RSD 108 may send an instruction to the first valve to close, to eliminate the leak.

In some embodiments, a RSD 108 can be operated in different sensing modes based on current conditions. For example, a RSD 108 may be operated in a first mode (e.g., a low-power, low sensitivity sensing mode) under normal operating conditions and, in response to determining that an alert condition exists (e.g., sensing abnormal conditions or receiving an alert 140), the RSD 108 may be operated in a second mode (e.g., a high-power, high sensitivity sensing mode). Such an embodiment may enable the RSD 108 to save power (e.g., by reducing power consumption during normal operations), and still provide sufficient levels of sensing when an alert condition exists (e.g., by switching to a more sensitive sensing mode when an alert condition exists).

Figure 4:
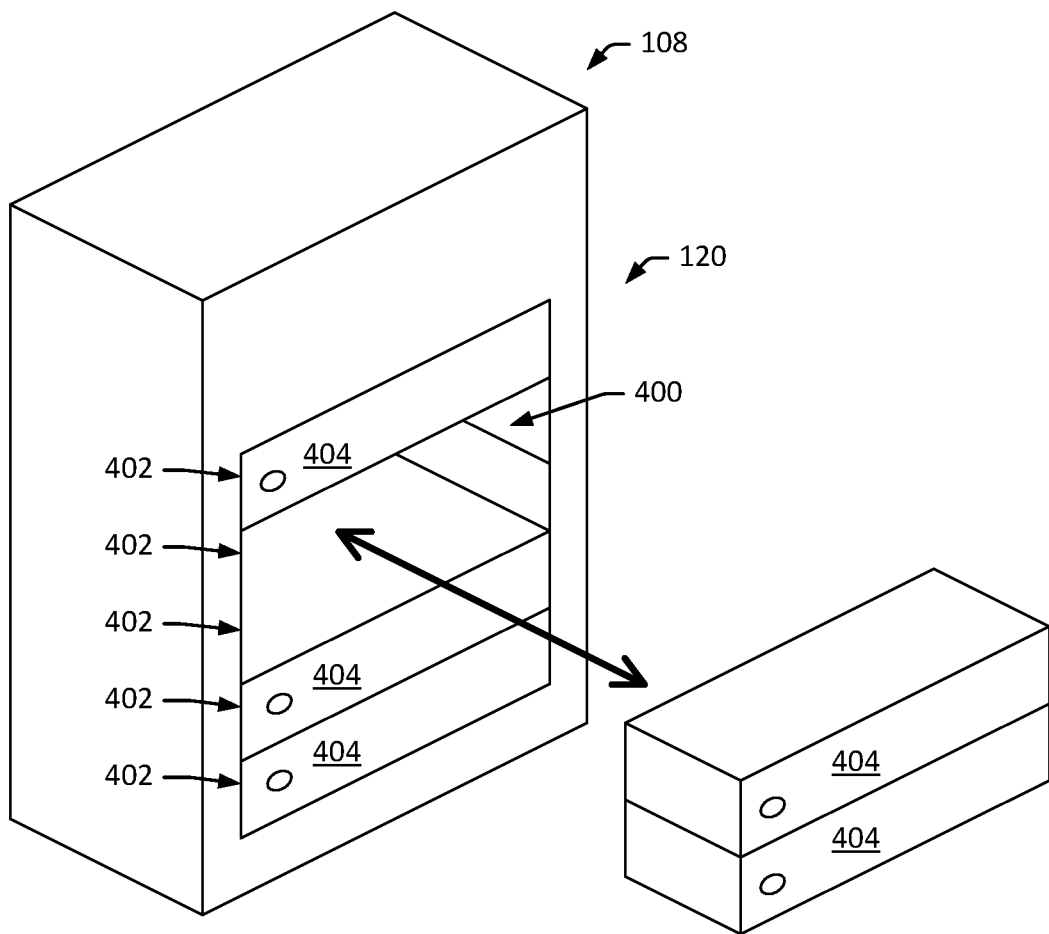
FIG. 4 is a diagram that illustrates a RSD employing a modular sensing unit in accordance with one or more embodiments.

In some embodiments, a RSD 108 is modular, including a modular sensing unit 120 that enables one more sensors to be installed into and/or removed from the sensing unit 120 of the RSD 108. FIG. 4 is a diagram that illustrates a RSD 108 employing a modular sensing unit 120 in accordance with one or more embodiments. In some embodiments, the modular sensing unit 120 includes a sensor bay 400 having sensor module slots 402 for receiving sensor modules 404. For example, first, second, third, fourth and fifth sensor modules 404 can be installed into the first, second, third, fourth and fifth sensor module slots 402, respectively. In some embodiments, each of the sensor module slots 402 has a given profile and each of the sensor module 404 has a complementary profile, such that each of the sensor modules 404 can be installed into in any of the sensor module slots 402. This may allow a person 110 to easily exchange sensor modules 404 on demand, as their needs dictate. A sensor module 404 can include, for example, a temperature sensor module including one or more temperature sensors, a flowrate sensor module including one or more flowrate sensors, a pressure sensor module including one or more pressure sensors, a vibration sensor module including one or more vibration sensors, a gas detection sensor module including one or more gas detection sensors, an acoustic sensor module including one or more acoustic sensors, and/or a location sensor module including one or more location sensors. In some embodiments, a sensor module 404 can include a power source (e.g., a rechargeable battery pack) that can provide electrical power for operating the RSD 108 when installed into a sensor module slot 402 of the RSD 108. Various combinations of sensor modules 404 can be installed to provide different combinations of sensors in the RSD 108. For example, a temperature sensor module 404 and a location sensor module 404 may be installed into the sensor bay 400 to enable the RSD 108 to sense temperature and location. A gas detection sensor module 404 may be subsequently installed to enable the RSD 108 to sense temperature, location and the presence/concentration of certain gases. The temperature sensor module 404 may be exchanged with a vibration sensor module 404, to enable the RSD 108 to sense vibrations, location and the presence/concentration of certain gases. In some embodiments, a sensor module 404 can be installed into or removed from a sensor module slot 402 by simply sliding the sensor module 404 into or out of the sensor module slot 402, as illustrated by the arrow. A sensor module slot 402 and/or a sensor module 404 may include a latching mechanism to secure the sensor module 404 in the sensor module slot 402. A sensor module 404 may include an electrical connection that mates with a complementary electrical connection of a sensor module slot 402 to enable communication between the sensor module 404 and the processing unit 130 of the RSD 108 and/or for transmitting electrical power between a power source of the RSD 108 and the sensor module 404. Such modular embodiments may improve the flexibility of the sensing unit 120, the RSD 108 and the ISS 102 as a whole. For example, a sensor module 404 can be installed into and/or removed from a RSD 108 on-demand, to meet current needs. In some embodiments, a sensor module 404 can be controlled remotely. For example, a sensor module 404 may be remotely enabled or disabled by the FSCS 106. In some embodiments, the RSD 108 may need to be a physically "safe" module to satisfy safety requirements in hazardous parts of the plants. For example, the RSD 108 may need to meet requirements to inhibit the ignition of hazardous materials, such as flammable gases and liquids. To meet such requirements, in some embodiments, an interface between the sensor module 404 and the RSD 108 can include a wireless connection, such as a near field communication (NFC) or Bluetooth connection). In some embodiments, such as where wireless connections between the sensor module 404 and the RSD 108 are employed, there are no exposed physical wires or pins between the sensor module 404 and the RSD 108, eliminating potential ignition sources. In some embodiments, the modules 404 or the RSD 108 include local power sources, such as low voltage batteries. In some embodiments, the modules 404 or the RSD 108 each includes an energy harvesting device that is capable of charging batteries of the respective device, such as a device for harvesting energy from movement of the respective device.

A person 110 may be alerted to install certain types of sensor modules 404 based on a location associated with the person 110 and/or the RSD 108 associated with the person 110. In some embodiments, a person 110 is alerted to install one or more sensor modules 404 into their RSD 108 based on one or more locations the person 110 is scheduled to work in. For example, if the FSCS 106 determines that a person 110 is scheduled to work a shift in a first region of the facility 100 categorized as being prone to high temperatures, then the FSCS 106 may, at the beginning of the shift, send to the RSD 108 associated with that person 110, an alert 140 advising the person 110 to install a temperature sensor module 404 in the RSD 108 for the duration of the shift. The RSD 108 may present the alert 140 for receipt by the person 110, and may continue to present the alert 140 until the RSD 108 detects that a temperature sensor module 404 is installed into a sensor module slot 402 of the sensor bay 400 of the sensing unit 120 of the RSD 108. In such an embodiment, the person 110 may simply install a temperature sensor module 404 into a sensor module slot 402 of the RSD 108 to satisfy the alert 140. The person 110 may simply remove the a temperature sensor module 404 from the sensor module slot 402 at the completion of the shift, after exiting the first region.

In some embodiments, a person 110 is alerted to install one or more sensor modules 404 into their RSD 108 based on a current location of the person 110 and/or the RSD 108. For example, if the FSCS 106 determines that a RSD 108 worn by (or otherwise associated with) a person 110 is located in a second region of the facility 100 categorized as being prone to gas leaks, then the FSCS 106 may send to the RSD 108, an alert 140 advising the person 110 to install a gas detection sensor module 404 in the RSD 108 while they are located in the second region. The RSD 108 may present the alert 140 for receipt by the person 110, and may continue to present the alert 140 until the RSD 108 detects that the gas detection module 404 is installed into a sensor module slot 402 of the RSD 108. In such an embodiment, the person 110 may simply install a gas detection sensor module 404 into a sensor module slot 402 of the RSD 108 to satisfy the alert 140. The person 110 may simply remove the gas detection sensor module 404 from the sensor module slot 402 after exiting the second region.

Figure 5:
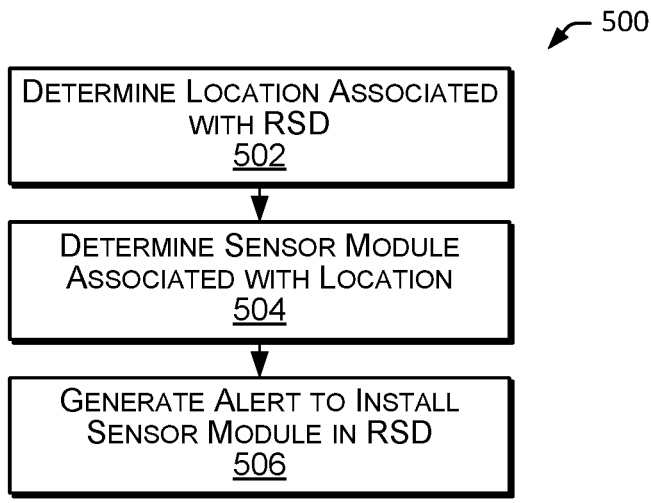
FIG. 5 is a block diagram that illustrates a method of operating an industrial safety system (ISS) employing modular RSDs in accordance with one or more embodiments.

FIG. 5 is a block diagram that illustrates a method 500 for operating an ISS 102 employing modular RSDs 108 in accordance with one or more embodiments. Method 500 can include determining one or more locations associated with a RSD (block 502), determining one or more sensor modules associated with the one or more locations (block 504), and generating an alert to install the one or more sensor modules in the RSD (block 506). In some embodiments, the operations of method 500 are performed by the RSD 108 and/or the FSCS 106.

In some embodiments, determining one or more locations associated with a RSD (block 502) includes determining one or more locations associated with a RSD 108 associated with a person 110. Determining one or more locations associated with a RSD 108 associated with a person 110 may include the FSCS 106 determining that a RSD 108 is associated with one or more regions of a facility 100 based on a person 110 the RSD 108 is assigned to, or otherwise associated with, being scheduled to work a shift in the one or more regions of the facility 100. In such an embodiment, before or during the shift, the FSCS 106 may access a work schedule for the person 110 and/or other persons 110 working in the facility (e.g., a work schedule stored in memory 132) that specifies one or more regions of the facility 100 (e.g., Areas 4 and 5) the person 110 is scheduled to work in during the shift, and identify those regions (e.g., Areas 4 and 5) as locations associated with the RSD 108. As another example, determining one or more locations associated with a RSD 108 associated with a person 110 can include the FSCS 106 and/or a RSD 108 determining one or more regions in which the RSD 108 is located in. In such an embodiment, the FSCS 106 and/or a RSD 108 may determine a current physical location of the RSD 108, determine one or more regions of the facility 100 that include the location (e.g., Area 3), and identify the one or more regions as the location associated with the RSD 108. The RSD 108 and/or the FSCS 106 may determine a physical location of the RSD 108, for example, based on a location sensed by a location sensor (e.g., global positioning system (GPS) sensor) of the RSD 108. The FSCS 106 may determine the physical location based on a physical location of the RSD 108 indicated in safety data 138 communicated from the RSD 108 to the FSCS 106.

In some embodiments, determining one or more sensor modules associated with the one or more locations (block 504) includes determining one or more sensor modules 404 that are suggested or required to be employed at the one or more locations. Referring to the first example, determining one or more sensor modules 404 that are suggested or required to be employed at the one or more locations may include the FSCS 106 and/or the RSD 108 determining that a temperature sensor module is to be employed in the identified regions of the facility 100 that the person 110 is scheduled to work in during their shift (e.g., a temperature sensor module is required in Areas 4 and 5 that the person 110 is scheduled to work in during their shift). Referring to the second example, determining one or more sensor modules 404 that are suggested or required to be employed at the one or more locations may include the FSCS 106 and/or the RSD 108 determining that a gas detection sensor module is to be employed in the region of the facility 100 including the location (e.g., a gas detection sensor module is required in Area 3 in which the RSD 108 is determined to be located).

In some embodiments, generating an alert to install the one or more sensor modules in the RSD (block 506) includes generating and/or presenting an alert 140 to advise a person 110 to install the one or more sensor modules 404 in the RSD 108. Referring to the first example, generating an alert 140 to advise a person 110 to install the one or more sensor modules 404 in the RSD 108 may include the FSCS 106 generating and sending to the RSD 108, and/or the RSD 108 generating and/or presenting, an alert 140 to advise the person 110 to install a temperature sensor module 404 in the RSD 108. Presentation of the alert 140 may include, for example, the RSD 108 displaying and/or audibly reciting the message "You are required to install a temperature sensor module for visiting Areas 4 and 5 during your shift today" and/or illuminating a yellow flashing light and/or sounding a buzzer to indicate that a required temperature sensor module 404 is not installed in the RSD 108. The RSD 108 may continue to present the alert 140 until the RSD 108 detects that a temperature sensor module 404 is installed in the RSD 108, or the person has exited Areas 4 and 5 and the shift has ended. Referring to the second example, generating an alert 140 to advise a person 110 to install the one or more sensor modules 404 in the RSD 108 may include the FSCS 106 generating and sending to the RSD 108, and/or the RSD 108 generating and/or presenting, an alert 140 to advise the person 110 to install a gas detection sensor module 404 in the RSD 108. Presentation of the alert 140 may include, for example, the RSD 108 displaying and/or audibly reciting the message "You are required to install a gas detection sensor module while located in Area 3" and/or illuminating a yellow flashing light and/or sounding a buzzer to indicate that a required sensor module 404 (e.g., a gas detection sensor module 404) is not installed in the RSD 108. The RSD 108 may continue to present the alert 140 until the RSD 108 detects that a gas detection sensor module 404 has been installed in the RSD 108, or the RSD 108 has moved out of the region (e.g., the RSD 108 has moved out of out of Area 3). The external presentation of an alert 140, such as a flashing light and/or buzzer, may help to alert the person 110 and other persons 110 near the RSD 108 that a required sensor module 404 is not installed in the RSD 108. In such an embodiment, the other persons 110 may become aware of the situation, alert the person 110 to the situation, and/or otherwise remind and encourage the person 110 to install the required sensor module 404 and/or leave the region.

In some embodiments, the facility 100 may include one or more stations for providing sensor modules 404. For example, the industrial facility 100 may include kiosk located throughout the facility that have multiple sensor modules 404 of varying types that can be taken by persons 110 for installation into their RSD 108 (e.g., prior to entering a region of the facility 100 requiring the sensor module 404) and/or can be uninstalled from the RSD 108 and returned to a kiosk in the facility 100 once they are no longer needed by the person 110 (e.g., after leaving a region of the facility 100 requiring the sensor module 404). In some embodiments, the kiosk can include automated vending machines that automatically distribute a sensor module 404 suggested and/or required to be used by a person 110 and/or the RSD 108 associated with the person. For example, a person 110 may approach a kiosk, enter information indicating which regions they will be working in (e.g., the person 110 selects areas 4 and 5 from a map displayed on the kiosk), the kiosk may provide an indication of the suggested and/or required sensor modules 404 for the regions (e.g., displaying and/or audibly reciting the message "You are required to install a temperature sensor module for visiting Areas 4 and 5 during your shift today . . . "), provide an option to select which sensor modules 404 the person 110 does and/or does not already have installed in their RSD 108 (" . . . please select the sensor modules you already have installed in your RSD"), and may automatically dispense the sensor modules 404 the person 110 does not already have installed in their RSD 108 for installation in the RSD 108. In some embodiments, enter information indicating which regions the person 110 will be working in can include the person 110 submitting a personal identifier (e.g., an employee identifier), and the kiosk may determine the areas the person 110 will be working in based on a work schedule for the person 110, as described herein, such that the kiosk will automatically recommend and/or dispense the sensor modules 404 suggested and/or required for the shift of the person 110. In some embodiments, a kiosk may be located at the entrance to or in a region, and may automatically recommend and/or dispense the sensor modules 404 suggested and/or required for working in the region. In some embodiments, a sensor module 404 physically installed in a RSD 108 may be activated (e.g., enabled for use) or deactivated (e.g., disabled for use). For example, installation of a sensor module 404 into a RSD 108 may include physically installing the module 404 into the RSD 108 and/or activating the sensor module 404. Un-installing a sensor module 404 from a RSD 108 may include physically removing the module 404 from the RSD 108 and/or de-activating the sensor module 404.

Such embodiments of modular sensing units 120 may enable RSDs 108 to be customized to meet particular monitoring needs. This can help to reduce the physical weight and size of the RSDs 108, for example, by eliminating the need to carry unneeded sensors, and can improve performance, for example, by reducing power consumption that may otherwise be attributable to unneeded sensors drawing power to operate. Moreover, the ability to add and remove sensor modules 404 can reduce the overall number of sensors used by a facility 100, as each person 110 can add and remove sensor on-demand to meet their individual needs, and does not need to continually carry the full array of sensors for the entire facility 100. Further, such embodiments can help to ensure that persons 110 in a facility 100 are carrying appropriate sensors while working in and moving about the facility 100.

In some embodiments, the ISS 102 employs intelligence to monitor and learn characteristics of the facility 100 and/or persons 110, and adapts alerts 140 and/or other operations to the learned characteristics. In some embodiments, the FSCS 106 dynamically categorizes conditions based on responses to corresponding alerts 140. For example, the FSCS 106 may categorize each of a plurality of sets of conditions in different risk categories. This can include, for example, categorizing a first set of conditions (e.g., a relatively high temperature detected by a single RSD 108) in a low risk category, categorizing a second set of conditions (e.g., a relatively high temperature detected by two or more RSD 108 in the same region of the facility 100) in a moderate risk category, and categorizing a third set of conditions (e.g., a relatively high temperature detected by RSD 108 in adjacent regions of the facility 100) in a high risk category. Each of the risk categories may be associated with a corresponding type of alert 140. For example, the low risk category may be associated with a relatively low priority local alert 140 (e.g., sending an alert 140 to only the RSD 108 that detected the relatively high temperature), the moderate risk category may be associated with a relatively moderate priority regional alert 140 (e.g., sending an alert 140 to all of the RSDs 108 currently located in the region in which the two or more RSD 108 detected the relatively high temperature and/or sounding an alarm and/or flashing warning lights in the region), and the high risk category may be associated with a relatively high priority, plant-wide alert 140 (e.g., sending an alert 140 to all of the RSDs 108 located in the facility 100 and/or sounding an alarm and/or flashing warning lights across the entire facility 100).

During operations, the FSCS 106 may collect safety data 128 from one or more RSD 108 and/or one or more other sensing device located throughout the facility 100, and process the safety data 128 to determine current conditions in the facility 100. In response to determining that a particular set of conditions associated with a risk is encountered, the FSCS 106 may issue a corresponding alert 140. For example, in response to the FSCS 106 determining that a relatively high temperature is detected by two or more RSD 108 in the same region of the facility 100, the FSCS 106 may send an alert 140 to all of the RSDs 108 currently located in the region and/or sound an alarm and/or flash warning lights in the region. The FSCS 106 may monitor responses to the alert 140, including how it is categorized by response personnel. This can include a response indicating whether the conditions were valid (e.g., not a false alarm), and whether the alert 140 was of a correct priority, too low of a priority or too high of a priority. Such a response may be provided by safety personnel that reviews the safety incidents. If the FSCS 106 determines that a threshold number of responses to the current alert 140 for a given set of conditions is not of the correct priority (e.g., too high or too low), the FSCS 106 may re-categorize the set of conditions in a different risk category. For example, if a "too high" threshold is set to five consecutive instances, the second set of conditions are encountered five times, resulting in five corresponding relatively moderate priority regional alerts 140, and all five of the alerts 140 have a response of "too high", then the FSCS 106 may re-categorize the second set of conditions as low risk. Accordingly, the next time the FSCS 106 identifies the second set of conditions, the FSCS 106 may issue a relatively low priority local alert 140 (e.g., sending an alert 140 to only the RSDs 108 that detected the relatively high temperature). As a further example, if a "too low" threshold is set to 1, the second set of conditions are encountered one time, resulting in a corresponding relatively moderate priority regional alert 140, and the alert 140 has a response of "too low", then the FSCS 106 may re-categorize the second set of conditions as high risk. Accordingly, the next time the FSCS 106 identifies the second set of conditions, the FSCS 106 may issue a relatively high priority plant-wide alert 140 (e.g., sending an alert 140 to all of the RSDs 108 located in the facility 100 and/or sounding an alarm and/or flashing warning lights across the entire facility 100).

Figure 6:
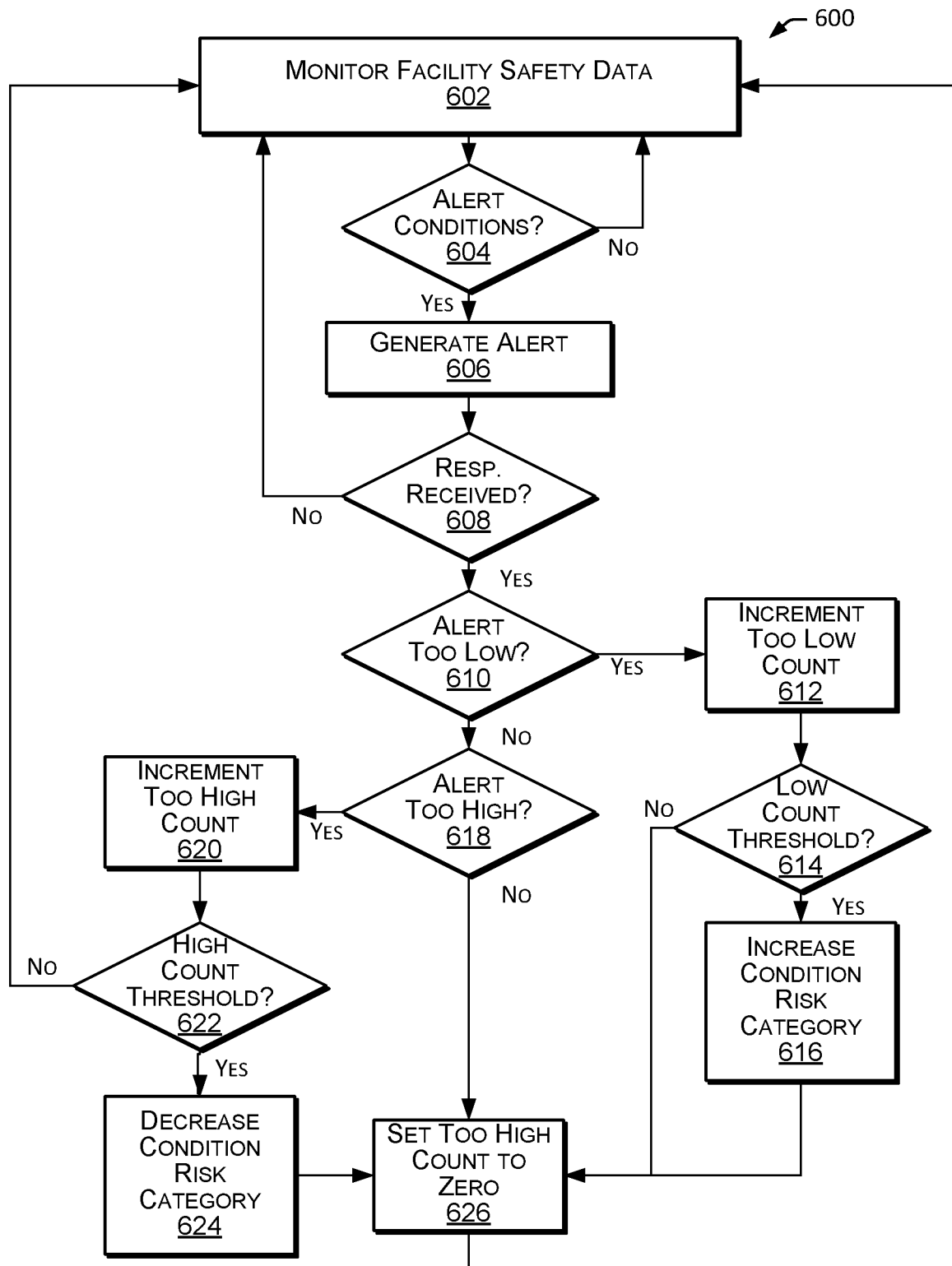
FIG. 6 is a block diagram that illustrates a method of dynamically categorizing conditions based on responses to corresponding alerts in accordance with one or more embodiments.

FIG. 6 is a block diagram that illustrates a method 600 of dynamically categorizing conditions based on responses to corresponding alerts 140. The method 600 may be executed, for example, by the processing unit 130 of the FSCS 106. In some embodiments, method 600 includes monitoring facility safety data (block 602). This can include the FSCS 106 collecting safety data 128 from one or more RSD 108 and/or one or more sensing device located throughout the facility 100, processing the safety data 128 to determine current conditions in the facility 100, and comparing the current conditions to a predefined listing of alert conditions to determine whether one more alert conditions exists (block 604), such as a relatively high temperature detected by two or more RSDs 108 in the same region of the facility 100. In response to determining that one more alert conditions exists, the FSCS 106 may proceed to generating an alert (block 606) and monitoring to determine whether a response to the alert is received (block 608). This can include generating a relatively moderate priority regional alert 140 that includes sending an alert 140 to all of the RSDs 108 currently located in the region in which the two or more RSD 108 detected the relatively high temperature, for presentation by the RSDs 108, and/or sounding an alarm and/or flashing warning lights in the region, as well as monitoring any responses to the alert 140, including how the alert 140 is categorized by response personnel. In response to the FSCS 106 receiving a response (e.g., from facility safety personnel) indicating that the alert is "too low" of a priority for the associated conditions (block 610), the FSCS 106 may proceed to increment to a "too low" count (e.g., adding 1 to the current value of the too low count for the combination of the set of conditions including a relatively high temperature detected by two or more RSDs in the same region of the facility and the moderate priority regional alert) (block 612), and compare the resulting too low count to a "too low count" threshold (e.g., a predefined low count threshold of 1 for the combination of the set of conditions including a relatively high temperature detected by two or more RSDs in the same region of the facility and the moderate priority regional alert) (block 614). If the low count threshold is satisfied (e.g., the too low count is equal to or greater than 1), then the FSCS 106 may increase the condition risk category (block 616), such as re-categorizing the second set of conditions (e.g., a relatively high temperature detected by two or more RSDs in the same region of the facility) into a high risk category associated with a relatively high priority plant-wide alert 140, such as sending an alert 140 to all of the RSDs 108 located in the facility 100 and/or sounding an alarm and/or flashing warning lights across the entire facility 100. In response to the FSCS 106 receiving a response is indicating that the alert is "too high" of a priority for the associated conditions (block 618), the FSCS 106 may proceed to increment the "too high" count (e.g., adding 1 to the current value of the too high count for the combination of the set of conditions including a relatively high temperature detected by two or more RSDs in the same region of the facility and the moderate priority regional alert) (block 620), and compare the resulting too high count to a "too high count" threshold (e.g., a predefined high count threshold of 5 for the combination of the set of conditions including a relatively high temperature detected by two or more RSDs in the same region of the facility and the moderate priority regional alert) (bock 622). If the too high count threshold is satisfied (e.g., the too high count is equal to or greater than 5), then the FSCS 106 may decrease the condition risk category (block 624), such as re-categorizing the second set of conditions into a low risk category associated with a relatively low priority local alert 140, such as sending an alert 140 to only RSDs 108 that detect a relatively high temperature. In response to determining that a response is received that does not indicate the alert is too high or too low (e.g., receiving a response indicating that the issued alert 140 is of the correct priority or otherwise appropriate) (block 608, 610 and 618), increasing a condition risk category (block 616) or decreasing a condition risk category (block 624), the FSCS 106 may proceed to set the too high count to zero (block 626). In response to determining that a response is not received (block 608), determining that the too high count threshold is not satisfied (block 622), or setting the too high count to zero (block 626) the FSCS 106 may return to monitoring the facility safety data (block 602). Such an embodiment can help to ensure that sets of conditions are provided with an alert that corresponds to their associated level of risk.

In some embodiments, zones of interest within the facility 100 are dynamically modified. For example, the FSCS 106 may obtain information regarding the physical layout of the facility (e.g., including the location of pressure vessels containing gas in Areas 3 and 6, and the location of turbomachinery in Areas 4 and 7), and the FSCS 106 may generate different risk zones based on the layout of the facility (e.g., a first "leak risk" zone that includes Areas 3 and 6, and a second "rotating hazard" zone that includes Areas 4 and 7). The zones may be dynamically modified based on characteristics of the zones and the environment. For example, if the FSCS 106 initially identifies the first leak zone as including Areas 3 and 6 (but does not include Area 5 which is located adjacent to and Southeast of Area 3), the FSCS 106 receives safety data 128 from one or more RSDs 108, one or more sensing devices located throughout the facility 100, and/or from an external weather provider, indicating a Northwest wind of 3 miles per hour in Area 3, the FSCS 106 determines that a gas leak in Area 3 is likely to spread into Area 5 based on the wind speed and direction, then the FSCS 106 may dynamically add Area 5 to the first leak zone. In accordance with embodiments described herein, the updated zone can be used as a basis for alerts 140. For example, if a leak is detected in Area 3 a corresponding alert 140 may include instructions to evacuate Areas 3, 5 and 6, as well directions for navigating around potentially hazardous area (e.g., "Move immediately to Area 1 by way of Area 2 and Area 4; Avoid Areas 3, 5 and 6"). In accordance with embodiments described herein, the updated zones can be used as a basis for alerts 140 relating to installation of required sensing modules 404. For example, if a RSD 108 initially alerts a person 110 to install a temperature sensor module 404 based on his/her work schedule indicating that he/she will be working in Area 5 during his/her shift and/or based on the RSD 108 being located in Area 5, in response to the Area 5 being added to the "leak zone" which requires use of a gas detection sensor module 404, an updated alert 140 may generated and presented at the RSD 108, notifying the person 110 that they now need to install a gas detection sensor module 404 Presentation of the alert 140 may include, for example, the RSD 108 displaying and/or audibly reciting the message "Based on changing wind conditions, you are now required to install a gas detection sensor module while located in Area 5" and/or illuminating a yellow flashing light and/or sounding a buzzer to indicate that a required sensor module 404 (e.g., a gas detection sensor module 404) is not installed in the RSD 108. The RSD 108 may continue to present the alert 140 until the RSD 108 detects that a gas detection sensor module 404 has been installed in the RSD 108, the RSD 108 has moved out of the leak zone (e.g., the RSD 108 has moved out of out of Areas 3, 5 and 6), or the leak zone has been updated to no longer include the current location of the RSD 108.

In some embodiments, monitoring of zones of interest is dynamically adjusted based on changing characteristics of the zone. For example, if Area 5 is not initially included in a first "leak zone" identified as being susceptible to gas leaks, including Areas 3 and 6, then the FSCS 106 may initially command the RSDs 108 of the facility 100 to operate their gas detection sensor modules 404 in a low-sensitivity while they are located in the Area 5. In response to the FSCS 106 detecting a subsequent change in conditions indicating that Area 5 is now susceptible to gas leaks (e.g., the FSCS 106 detecting a Northwest wind of 3 miles per hour in Area 3, and Area 5 being located Southeast of Area 3 such that Area 5 is now susceptible to gas leaks), then the FSCS 106 may add Area 5 to the first leak zone. The FSCS 106 may, then, command RSDs 108 of the facility 100 to operate their gas detection sensor modules 404 in a high-sensitivity mode while they are located in the first leak zone, including Area 5, and/or command RSDs 108 of the facility 100 to operate their gas detection sensor modules 404 in a low-sensitivity while they are not located in the first region (or another region susceptible to gas leaks).

Figure 7:
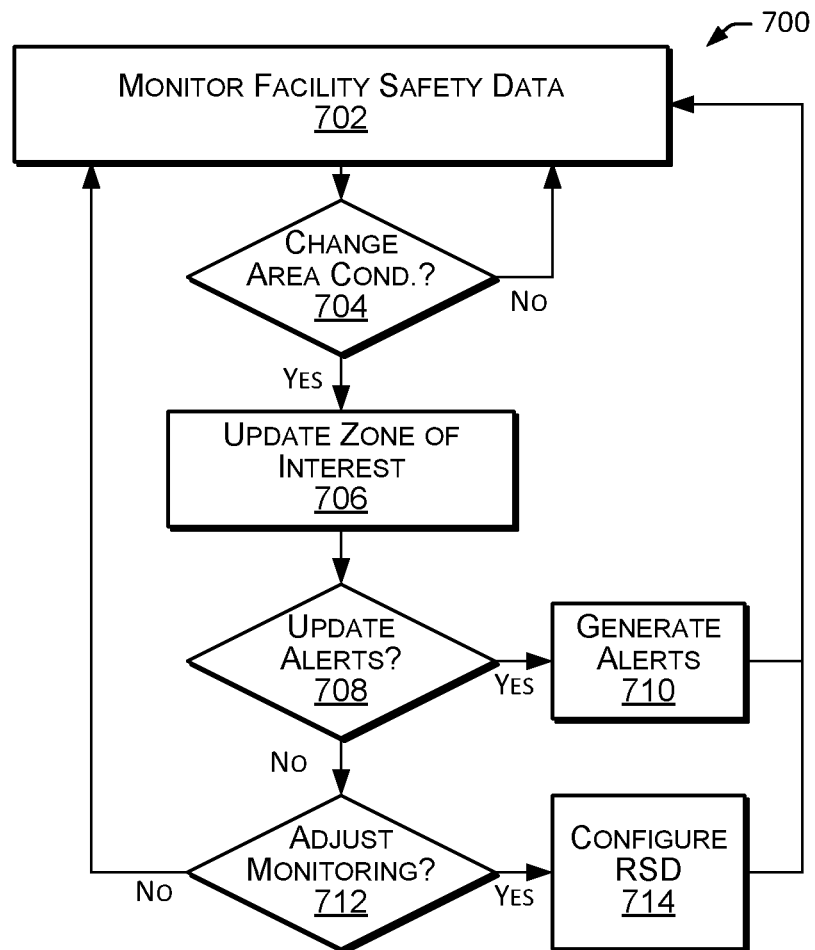
FIG. 7 is a block diagram that illustrates a method of dynamically modifying zones of interest within an industrial facility in accordance with one or more embodiments.

FIG. 7 is a block diagram that illustrates a method 700 of dynamically modifying zones of interest within the facility 100 in accordance with one or more embodiments. The method 700 may be executed, for example, by the processing unit 130 of the FSCS 106. In some embodiments, method 300 includes monitoring facility safety data (block 702). This can include the FSCS 106 collecting safety data 128 from one or more RSD 108 and/or one or more sensing devices located throughout the facility 100, processing the safety data 128 to determine current conditions in the facility 100, and comparing the current conditions to prior conditions to determine whether conditions have changed enough to warrant a change in the definition of one or more zones of interest (block 704), such as an increase in wind speed in Area 3, which is currently including with Area 6 is a first "leak zone" of interest, detected by wind gauges in or around Area 3. In response to the FSCS 106 determining that conditions have changed enough to warrant a change in the definition of one or more zones of interest, the FSCS 106 may proceed to updating the one or more zones of interest (block 706). For example, if the FSCS 106 initially identifies the first leak zone as including Areas 3 and 6 (but does not include Area 5 which is located adjacent to an Southeast of Area 3), the FSCS 106 receives safety data 128 from one or more RSD 108 and/or one or more sensing devices located throughout the facility 100 indicating a Northwest wind of 3 miles per hour in Area 3, the FSCS 106 determines that a gas leak in Area 3 is likely to spread into Area 5 based on the wind speed and direction, then the FSCS 106 may dynamically add Area 5 to the first leak zone. In response to updating a zone of interest, the FSCS 106 may determine whether any updated alerts need to be sent (block 708), and may generate corresponding alerts (block 710). For example, with regard to installation of required sensing modules 404, if an initial categorization of Area 5 requires RSDs 108 in Area 5 to install only a temperature sensor module 404 while located in Area 5, in response to Area 5 being added to the "leak zone" (which requires use of a gas detection sensor module 404 while located in Area 5), the FSCS 106 may generate an updated alert 140 that is sent to RSDs 108 in Area 5, requiring the RSDs 108 to have a gas detection sensor module 404 installed. In response to each of the RSDs in Area 5 receiving the alert 140, each of the RSDs 108 may check to see if a gas detection sensor module 404 is installed in the RSD 108, and if not the RSD 108 may present an alert 140 notifying the person 110 wearing the RSD 108 that they now need to install a gas detection sensor module 404. Presentation of the alert 140 may include, for example, the RSD 108 displaying and/or audibly reciting the message "Based on changing wind conditions, you are now required to install a gas detection sensor module while located in Area 5" and/or illuminating a yellow flashing light and/or sounding a buzzer to indicate that a required sensor module 404 (e.g., a gas detection sensor module 404) is not installed in the RSD 108. The RSD 108 may continue to present the alert 140 until the RSD 108 detects that a gas detection sensor module 404 has been installed in the RSD 108, the RSD 108 has moved out of the leak zone (e.g., the RSD 108 has moved out of out of Areas 3, 5 and 6), or the leak zone has been updated to no longer include a current location of the RSD 108. As described herein, in response to detecting an alert condition, the FSCS 106 may issues alerts 140 based on the updated zone of interest. For example, in response to the FSCS 106 detecting a leak in Area 3, a corresponding alert 140 may be issued to RSDs 108 in the facility 100, including instructions to evacuate Areas 3, 5 and 6, as well directions for navigating around potentially hazardous area (e.g., "Move immediately to Area 1 by way of Area 2 and Area 4; Avoid Areas 3, 5 and 6"). The FSCS 106 may also determine whether monitoring conditions need to be adjusted based on the updated zone of interest (block 712), and, if so, configuring the RSDs 108 accordingly for the adjusted monitoring (block 714). For example, in response to Area 5 being added to the first leak zone, the FSCS 106 may command the RSDs 108 in the facility 100 to operate their gas detection sensor modules 404 in a high-sensitivity mode while they are located in any of Areas 3, 5 or 6, and/or command the RSDs 108 to operate their gas detection sensor modules 404 in a low-sensitivity while they are not located in the leak risk zone, or another zone identified as being susceptible to gas leaks.

In some embodiments, alerts 140 are adapted based on the operational status or other conditions of the facility 100. For example, if a portion of the facility 100 is operating normally, with operational equipment 104 that is a potential safety hazard (e.g., rotating equipment), then the FSCS 106 may issue an alert 140 to a RSD 108 in response to the FSCS 106 determining that the RSD 108 is approaching the equipment 104. If, however, the FSCS 106 determines that the facility 100 is operating in a partial shut-down that includes the equipment 104 being non-operational, such that the equipment 104 is not a potential safety hazard, then the FSCS 106 may not issue an alert 140 to a RSD 108 in response to the FSCS 106 determining that the RSD 108 is approaching the equipment 104. This can help to reduce false alarms and ensure that persons are provided with relevant alerts 140, reducing the likelihood the alerts 140 will be ignored. As a further example, in response to the FSCS 106 determining that the RSD 108 is approaching equipment 104 under un-safe conditions, such as the FSCS 106 determining that the RSD 108 is approaching a ladder and a wind speed at or near the location of the ladder is at or above a threshold level for ladder use, the FSCS 106 may issue a corresponding alert 140 to a RSD 108 for presentation (e.g., the RSD 108 displaying or audibly reciting "Wind speed is too high for ladder use"). If, however, the FSCS 106 determines that that the RSD 108 is approaching equipment 104 under safe conditions, such as the FSCS 106 determining that the RSD 108 is approaching the ladder and a wind speed at or near the location of the ladder is below a threshold level for ladder use, then the FSCS 106 may not issue a corresponding alert 140 to the RSD 108.

In some embodiments, alerts 104 are provided based on characteristics of a person 110 and/or potential safety issues. For example, if the FSCS 106 determines that a person 110 experiences a health issue when located in a particular region of the facility 100 and/or operating certain types of equipment 104, then the FSCS 106 may issue an alert 140 to a RSD 108 worn by the person 110, in response to determining that the RSD 108 is approaching the region of the facility 100 and/or the type of equipment 104. In some embodiments, the alert 140 includes a reminder of past experiences and a warning to use caution and/or a command to not proceed (e.g., the RSD 108 may display or recite audibly "You are approaching Area 3. Please do not enter Area 3. In the past, you have experienced nausea after entering Area 3"). Similarly, if a second person 110 has similar health issues as the first person 110, the FSCS 106 may determine that the other person 110 may be susceptible to similar risks, and issue a similar alert 140 to a RSD 108 worn by the other person 100 in response to the FSCS 106 determining that the RSD 108 worn by the other person is approaching the portion of the facility 100 and/or the type of equipment 104. Such an embodiment may help to deter persons from repeating or otherwise engaging in actions that have historically lead to safety issues.

Figure 8:
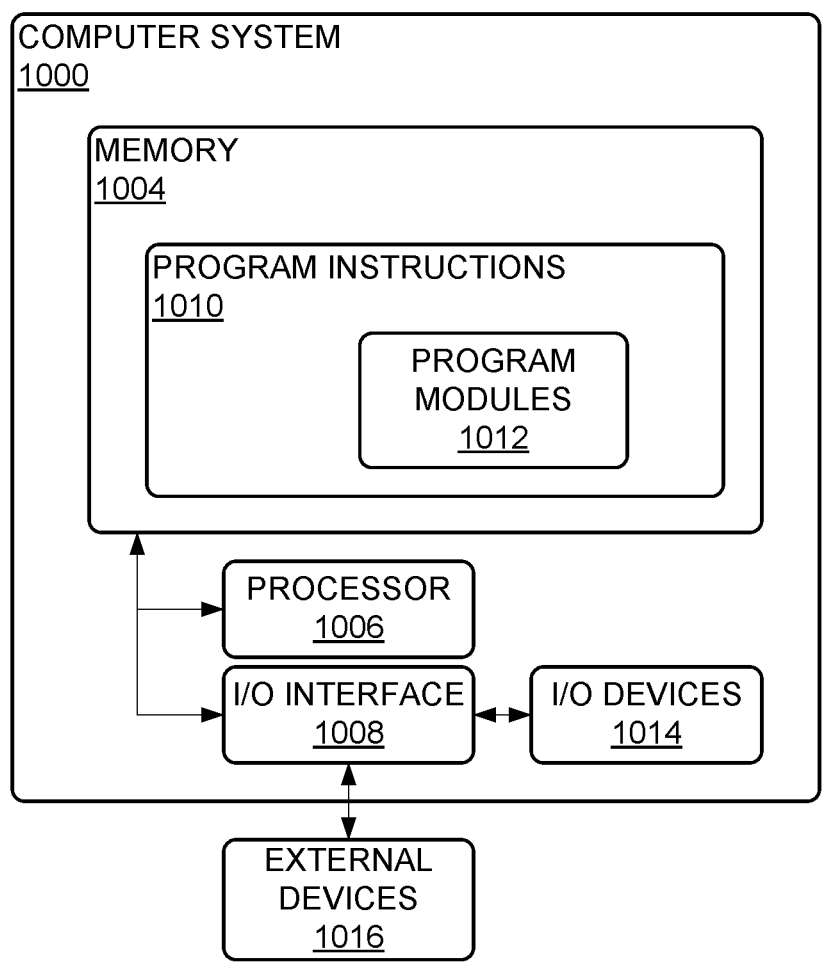
FIG. 8 is a diagram that illustrates an example computer system in accordance with one or more embodiments.

FIG. 8 is a diagram that illustrates an example computer system (or "system") 1000 in accordance with one or more embodiments. The system 1000 may include a memory 1004, a processor 1006 and an input/output (I/O) interface 1008. The memory 1004 may include one or more of non-volatile memory (e.g., flash memory, read-only memory (ROM), programmable read-only memory (PROM), erasable programmable read-only memory (EPROM), electrically erasable programmable read-only memory (EEPROM)), volatile memory (for example, random access memory (RAM), static random access memory (SRAM), synchronous dynamic RAM (SDRAM)), and bulk storage memory (e.g., CD-ROM or DVD-ROM, hard drives). The memory 1004 may include a non-transitory computer-readable storage medium having program instructions 1010 stored thereon. The program instructions 1010 may include program modules 1012 that are executable by a computer processor (e.g., the processor 1006) to cause the functional operations described, such as those described with regard to the FSCS 106 and/or the RSDs 108.

The processor 1006 may be any suitable processor capable of executing program instructions. The processor 1006 may include a central processing unit (CPU) that carries out program instructions (e.g., the program instructions of the program module(s) 1012) to perform the arithmetical, logical, and input/output operations described. The processor 1006 may include one or more processors. The I/O interface 1008 may provide an interface for communication with one or more I/O devices 1014, such as external sensors, a computer mouse, a keyboard, speakers and a display screen (e.g., an electronic display for displaying a graphical user interface (GUI)). The I/O devices 1014 may be connected to the I/O interface 1008 via a wired connection (e.g., Industrial Ethernet connection) or a wireless connection (e.g., a Wi-Fi connection). The I/O interface 1008 may provide an interface for communication with one or more external devices 1016, such as other computer devices and networks. In the context of a the computer system 1016 being that of an RSD 108, the external devices 1016 may include other RSDs 108 and/or the FSCS 106. In the context of a the computer system 1000 being that of the FSCS 106, the external devices 1016 may include the RSDs 108, external entities, and/or other sensing devices located throughout the facility 100.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided therein may be changed, and various elements may be added, reordered, combined, omitted, modified, etc. Portions of the processes and methods may be implemented in software, hardware, or a combination thereof. Some or all of the portions of the processes and methods may be implemented by one or more of the processors/modules/applications described herein.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., via an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. An industrial facility safety system, comprising:
a plurality of remote sensing devices (RSDs) configured to be distributed throughout an industrial facility; and
a facility safety control system (FSCS) configured to:
  receive safety data from the plurality of RSDs;
  process the safety data from the plurality of RSDs to determine one or more safety alerts; and
  send the one or more safety alerts to one or more RSDs of the plurality of RSDs,
each remote sensing device (RSD) of the plurality of RSDs comprising:
  a sensing unit comprising one more sensors configured to sense characteristics of an environment surrounding the RSD;
  a processing unit configured to process the sensed characteristics of the environment surrounding the RSD to generate safety data corresponding to characteristics of the environment surrounding the RSD sensed by the one or more sensors of the sensing unit of the RSD; and
  a communication unit configured to:
    send, to other RSDs of the plurality of RSDs and the FSCS, safety data; and
    receive, from other RSDs of the plurality of RSDs and the FSCS, safety data;
each RSD of the plurality of RSDs is configured to:
  identify safety data to be communicated to the FSCS by way of one or more other RSDs;
  in response to identifying safety data to be communicated to the FSCS by way of one or more other RSDs:
    identify one or more RSDs of the plurality of RSDs in communication range of the RSD and having a power level above a threshold power level; and
    select a second RSD of the plurality of RSDs from the one or more RSDs of the plurality of RSDs identified as being in communication range of the RSD and having a power level above the threshold power level; and
    send, to the second RSD, the safety data.

2. The system of claim 1, wherein each RSD of the plurality of RSDs is configured to:
  determine one or more RSDs of the plurality of RSDs is in communication range of the RSD;
  determine whether any of the one or more RSDs of the plurality of RSDs determined to be in communication range of the RSD has a power level above the threshold power level; and
  in response to determining that none of the one or more RSDs of the plurality of RSDs determined to be in communication range of the RSD has a power level above the threshold power level:
    identify a third RSD of the one or more RSDs of the plurality of RSDs determined to be in communication range of the RSD that has a highest power level; and
    send, to the third RSD, the safety data.

3. The system of claim 1, wherein each RSD of the plurality of RSDs is configured to:
  determine one or more RSDs of the plurality of RSDs is in communication range of the RSD;
  determine whether any of the one or more RSDs of the plurality of RSDs determined to be in communication range of the RSD has a power level above the threshold power level; and
  in response to determining that none of the one or more RSDs of the plurality of RSDs determined to be in communication range of the RSD has a power level above the threshold power level:
    broadcast the safety data for receipt by one or more RSDs of the plurality of RSDs.

4. The system of claim 1, wherein selecting the second RSD of the plurality of RSDs from the one or more RSDs of the plurality of RSDs identified as being in communication range of the RSD and having a power level above the threshold power level comprises:
  determining the second RSD to have a highest power level of the one or more RSDs of the plurality of RSDs identified as being in communication range of the RSD and having a power level above the threshold power level; and
  selecting, from the one or more RSDs of the plurality of RSDs identified as being in communication range of the RSD and having a power level above the threshold power level, the second RSD based on the second RSD being determined to have the highest power level of the one or more RSDs of the plurality of RSDs identified as being in communication range of the RSD and having a power level above the threshold power level.

5. The system of claim 1, wherein selecting the second RSD of the plurality of RSDs from the one or more RSDs of the plurality of RSDs identified as being in communication range of the RSD and having a power level above the threshold power level comprises:
  determining the second RSD to have a closest proximity to the FSCS of the one or more RSDs of the plurality of RSDs identified as being in communication range of the RSD and having a power level above the threshold power level; and
  selecting, from the one or more RSDs of the plurality of RSDs identified as being in communication range of the RSD and having a power level above the threshold power level, the second RSD based on the second RSD being determined to have the closest proximity to the FSCS of the one or more RSDs of the plurality of RSDs identified as being in communication range of the RSD and having a power level above the threshold power level.

6. The system of claim 5, wherein the proximity of the second RSD to the FSCS is determined based on a preconfigured assignment of the second RSD, a geographic location of the second RSD, a signal strength between the second RSD and the FSCS, or a dynamic hop query of the second RSD.

7. The system of claim 1, wherein the second RSD is configured to send, to the FSCS or another RSD of the plurality of RSDs, the safety data sent to the second RSD.

8. A method of operating an industrial facility safety system, the method comprising:

identifying, by a remote sensing device (RSD) of a plurality of remote sensing devices (RSDs) of an industrial facility safety system distributed throughout an industrial facility, safety data to be communicated to the FSCS by way of one or more other RSDs,
the industrial facility safety system comprising:
a facility safety control system (FSCS) configured to:
receive safety data from the plurality of RSDs;
process the safety data from the plurality of RSDs to determine one or more safety alerts; and
send the one or more safety alerts to one or more RSDs of the plurality of RSDs; and
the plurality of RSDs, wherein each RSD of the plurality of RSDs comprises:
a sensing unit comprising one more sensors configured to sense characteristics of an environment surrounding the RSD;
a processing unit configured to process the sensed characteristics of the environment surrounding the RSD to generate safety data corresponding to characteristics of the environment surrounding the RSD sensed by the one or more sensors of the sensing unit of the RSD; and
a communication unit configured to:
send, to other RSDs of the plurality of RSDs and the FSCS, safety data; and
receive, from other RSDs of the plurality of RSDs and the FSCS, safety data;
performing, by the RSD in response to identifying safety data to be communicated to the FSCS by way of one or more other RSDs, the following:
identifying one or more RSDs of the plurality of RSDs in communication range of the RSD and having a power level above a threshold power level; and
selecting a second RSD of the plurality of RSDs from the one or more RSDs of the plurality of RSDs identified as being in communication range of the RSD and having a power level above the threshold power level; and
sending, to the second RSD, the safety data.

9. The method of claim 8, further comprising the RSD performing the following:
determining one or more RSDs of the plurality of RSDs is in communication range of the RSD;
determining that none of the one or more RSDs of the plurality of RSDs determined to be in communication range of the RSD has a power level above the threshold power level; and
in response to determining that none of the one or more RSDs of the plurality of RSDs determined to be in communication range of the RSD has a power level above the threshold power level:
identifying a third RSD of the one or more RSDs of the plurality of RSDs determined to be in communication range of the RSD that has the highest power level; and
sending, to the third RSD, second safety data.

10. The method of claim 8, further comprising the RSD performing the following:
determining one or more RSDs of the plurality of RSDs is in communication range of the RSD;
determining that none of the one or more RSDs of the plurality of RSDs determined to be in communication range of the RSD has a power level above the threshold power level; and
in response to determining that none of the one or more RSDs of the plurality of RSDs determined to be in communication range of the RSD has a power level above the threshold power level:
broadcasting second safety data for receipt by one or more RSDs of the plurality of RSDs.

11. The method of claim 8, wherein selecting the second RSD of the plurality of RSDs from the one or more RSDs of the plurality of RSDs identified as being in communication range of the RSD and having a power level above the threshold power level comprises:
determining the second RSD to have a highest power level of the one or more RSDs of the plurality of RSDs identified as being in communication range of the RSD and having a power level above the threshold power level; and
selecting, from the one or more RSDs of the plurality of RSDs identified as being in communication range of the RSD and having a power level above the threshold power level, the second RSD based on the second RSD being determined to have the highest power level of the one or more RSDs of the plurality of RSDs identified as being in communication range of the RSD and having a power level above the threshold power level.

12. The method of claim 8, wherein selecting the second RSD of the plurality of RSDs from the one or more RSDs of the plurality of RSDs identified as being in communication range of the RSD and having a power level above the threshold power level comprises:
determining the second RSD to have a closest proximity to the FSCS of the one or more RSDs of the plurality of RSDs identified as being in communication range of the RSD and having a power level above the threshold power level; and
selecting, from the one or more RSDs of the plurality of RSDs identified as being in communication range of the RSD and having a power level above the threshold power level, the second RSD based on the second RSD being determined to have the closest proximity to the FSCS of the one or more RSDs of the plurality of RSDs identified as being in communication range of the RSD and having a power level above the threshold power level.

13. The method of claim 12, wherein the proximity of the second RSD to the FSCS is determined based on a preconfigured assignment of the second RSD, a geographic location of the second RSD, a signal strength between the second RSD and the FSCS, or a dynamic hop query of the second RSD.

14. The method of claim 8, further comprising the second RSD sending, to the FSCS or another RSD of the plurality of RSDs, the safety data sent to the second RSD.

15. A non-transitory computer readable storage medium comprising program instructions stored thereon that are executable by a computer processor to cause the following operations for operating an industrial facility safety system:
identifying, by a remote sensing device (RSD) of a plurality of remote sensing devices (RSDs) of an industrial facility safety system distributed throughout an industrial facility, safety data to be communicated to the FSCS by way of one or more other RSDs,
the industrial facility safety system comprising:
a facility safety control system (FSCS) configured to:
receive safety data from the plurality of RSDs;
process the safety data from the plurality of RSDs to determine one or more safety alerts; and send the one or more safety alerts to one or more RSDs of the plurality of RSDs; and the plurality of RSDs, wherein each RSD of the plurality of RSDs comprises:
- a sensing unit comprising one more sensors configured to sense characteristics of an environment surrounding the RSD;
- a processing unit configured to process the sensed characteristics of the environment surrounding the RSD to generate safety data corresponding to characteristics of the environment surrounding the RSD sensed by the one or more sensors of the sensing unit of the RSD; and
- a communication unit configured to:
  - send, to other RSDs of the plurality of RSDs and the FSCS, safety data; and
  - receive, from other RSDs of the plurality of RSDs and the FSCS, safety data;

performing, by the RSD in response to identifying safety data to be communicated to the FSCS by way of one or more other RSDs, the following:
- identifying one or more RSDs of the plurality of RSDs in communication range of the RSD and having a power level above a threshold power level; and
- selecting a second RSD of the plurality of RSDs from the one or more RSDs of the plurality of RSDs identified as being in communication range of the RSD and having a power level above the threshold power level; and
- sending, to the second RSD, the safety data.

16. The medium of claim 15, further comprising the RSD performing the following:
- determining one or more RSDs of the plurality of RSDs is in communication range of the RSD;
- determining that none of the one or more RSDs of the plurality of RSDs determined to be in communication range of the RSD has a power level above the threshold power level; and
- in response to determining that none of the one or more RSDs of the plurality of RSDs determined to be in communication range of the RSD has a power level above the threshold power level:
  - identifying a third RSD of the one or more RSDs of the plurality of RSDs determined to be in communication range of the RSD that has the highest power level; and
  - sending, to the third RSD, second safety data.

17. The medium of claim 15, further comprising the RSD performing the following:
- determining one or more RSDs of the plurality of RSDs is in communication range of the RSD;
- determining that none of the one or more RSDs of the plurality of RSDs determined to be in communication range of the RSD has a power level above the threshold power level; and
- in response to determining that none of the one or more RSDs of the plurality of RSDs determined to be in communication range of the RSD has a power level above the threshold power level:
  - broadcasting second safety data for receipt by one or more RSDs of the plurality of RSDs.

18. The medium of claim 15, wherein selecting the second RSD of the plurality of RSDs from the one or more RSDs of the plurality of RSDs identified as being in communication range of the RSD and having a power level above the threshold power level comprises:
- determining the second RSD to have a highest power level of the one or more RSDs of the plurality of RSDs identified as being in communication range of the RSD and having a power level above the threshold power level; and
- selecting, from the one or more RSDs of the plurality of RSDs identified as being in communication range of the RSD and having a power level above the threshold power level, the second RSD based on the second RSD being determined to have the highest power level of the one or more RSDs of the plurality of RSDs identified as being in communication range of the RSD and having a power level above the threshold power level.

19. The medium of claim 15, wherein selecting the second RSD of the plurality of RSDs from the one or more RSDs of the plurality of RSDs identified as being in communication range of the RSD and having a power level above the threshold power level comprises:
- determining the second RSD to have a closest proximity to the FSCS of the one or more RSDs of the plurality of RSDs identified as being in communication range of the RSD and having a power level above the threshold power level; and
- selecting, from the one or more RSDs of the plurality of RSDs identified as being in communication range of the RSD and having a power level above the threshold power level, the second RSD based on the second RSD being determined to have the closest proximity to the FSCS of the one or more RSDs of the plurality of RSDs identified as being in communication range of the RSD and having a power level above the threshold power level.

20. The medium of claim 19, wherein the proximity of the second RSD to the FSCS is determined based on a preconfigured assignment of the second RSD, a geographic location of the second RSD, a signal strength between the second RSD and the FSCS, or a dynamic hop query of the second RSD.

* * * * *